United States Patent

Mima

Patent Number: 5,734,385
Date of Patent: Mar. 31, 1998

[54] DRAWING METHOD AND APPARATUS USING RADIOSITY ALGORITHM

[75] Inventor: Toshiya Mima, Kanagawa, Japan

[73] Assignee: Fujitsu Limited, Kawasaki, Japan

[21] Appl. No.: 548,168

[22] Filed: Oct. 25, 1995

[30] Foreign Application Priority Data

Dec. 13, 1994 [JP] Japan .................. 6-308661
Aug. 31, 1995 [JP] Japan .................. 7-224336

[51] Int. Cl.⁶ .................................................. G09B 9/08
[52] U.S. Cl. .................................... 345/426; 345/425
[58] Field of Search ........................... 395/126, 119, 395/118

[56] References Cited

U.S. PATENT DOCUMENTS

| | | | |
|---|---|---|---|
| 4,928,250 | 5/1990 | Greenberg et al. | 364/518 |
| 5,058,042 | 10/1991 | Hanna et al. | 364/522 |
| 5,083,287 | 1/1992 | Obata et al. | 395/126 |
| 5,222,205 | 6/1993 | Larson et al. | 395/130 |

*Primary Examiner*—Phu K. Nguyen
*Assistant Examiner*—Cliff N. Vo
*Attorney, Agent, or Firm*—Armstrong, Westerman, Hattori, McLeland & Naughton

[57] ABSTRACT

An information setting section sets positional information of a point on each polygon to express the positions of polygons in each of a plurality of surfaces which is represented by a plurality of segmented polygons. A plurality of radiosity maps are set in association with a plurality of surfaces, and pixel values representing the radiosity maps are stored in association with the positional information of the individual polygons set by the information setting section. A map referring/drawing section reads the pixel value representing the radiosity map corresponding to each positional information stored in the radiosity map corresponding to each surface to form a radiosity image.

32 Claims, 25 Drawing Sheets

| VERTEX COORDINATE X |
| --- |
| VERTEX COORDINATE Y |
| VERTEX COORDINATE Z |
| VERTEX COLOR R AT DRAWING TIME |
| VERTEX COLOR G AT DRAWING TIME |
| VERTEX COLOR B AT DRAWING TIME |
| RADIOSITY S VALUE |
| RADIOSITY T VALUE |

TRIANGLE STRIP

FIGURE SEGMENTATION POINTS

TRIANGLE STRIP WITH OBTAINED SEGMENTATION VERTICES (SEGMENT NUMBER: 4)

FIRST VERTEX

THIRD VERTEX

SECOND VERTEX

TRIANGLE STRIP WITH SET SEGMENTATION VERTICES

SEGMENTED TRIANGLE STRIPS

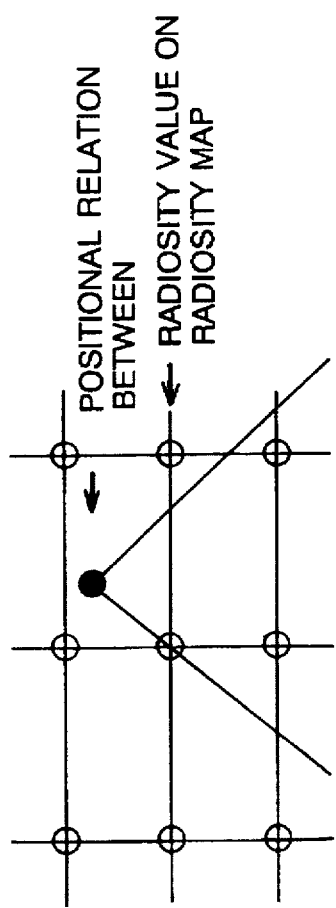
FIG. 26A
FIG. 26B
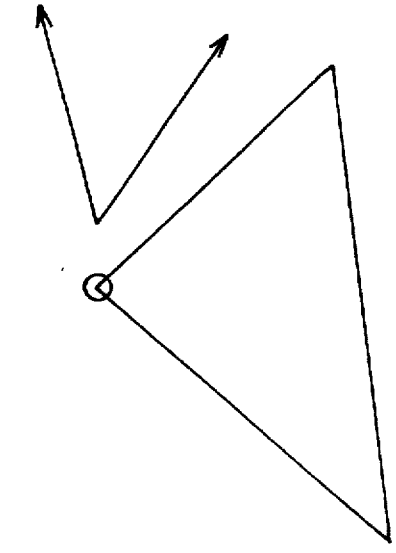
FIG. 26C
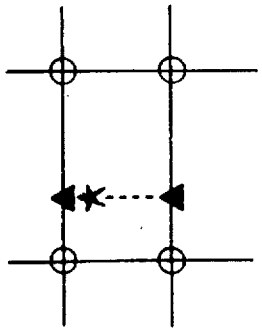
FIG. 26D
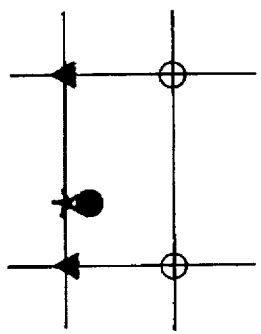
FIG. 26E
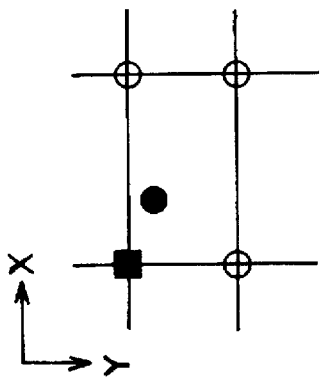

DRAWING METHOD AND APPARATUS USING RADIOSITY ALGORITHM

BACKGROUND OF THE INVENTION

1. Field of the Invention

The present invention relates to a figure display system for displaying figures, and, more particularly, to a drawing method and system using a radiosity algorithm for drawing figures based on a radiosity.

2. Description of the Related Art

Conventionally, figure display systems may draw a three-dimensional figure as a two-dimensional image on the display screen like the tube surface of a CRT (Cathode-Ray Tube) display. In this case, the displayed image lacks graphics information in the depth direction of the screen. The graphics information in the depth direction is expressed as depth feeling by the color of a figure and the shadow or shade of the color.

Generally, the shade of the color is acquired by computing the luminance of the surfaces, given by a figure, based on the positional relationship between the imaginary light source and the view point. The shade of the color of the figure obtained in this manner merely considers the direct light from the light source, so that while a certain degree of depth feeling is obtained, the results of realistic drawing cannot be acquired.

In this respect, attention is recently being paid to a drawing system using a radiosity algorithm which can compute the luminance of the surfaces even in consideration of the reflection and transmission between the surfaces. The radiosity algorithm pays attention to radiosity indicative of (the intensity of) the energy of light, acquires the radiosity of each surface by repeating the exchange of light energy between a plurality of surfaces until the value of the radiosity converges, and then treats this radiosity value as the luminance of that surface.

In computing the luminance, the following rendering equation 1 is used.

$$I(x_0,x_1)=g(x_0,x_1)[\epsilon(x_0,x_1)+\int \rho(x_0,x_1,x_2)I(x_1,x_2)\,dx_2] \quad (1)$$

The meaning of the rendering equation 1, which is associated with the computation of the luminance based on the law of energy conservation, will now be explained with reference to FIG. 1. In FIG. 1, $I(x_0, x_1)$ denote the luminance which is transmitted from a point $x_1$ on a surface $S_0$ to point $x_0$. $g(x_0, x_1)$, called the geometric term, shows if there is any geometric obstruction between points $x_1$ and $x_0$. In general, when the point $x_1$ is completely seen from the point $x_0$, $g(x_0, x_1)=1$, but when the point $x_1$ is blocked by another object's surface and is not seen at all, $g(x_0, x_1)=0$. $\epsilon(x_0, x_1)$ represents the energy intensity of light radiated by the object's surface $S_0$ itself toward the point $x_0$ from the point $x_1$. The last, integral term represents the sum of the amounts of light which are shot from all the other light radiation points in the scene and pass the point $x_1$ (by reflection or refraction) to be radiated toward the point $x_0$.

It is however hardly possible to strictly compute the integral term in the rendering equation 1. Therefore, the radiosity algorithm, dispersive ray-tracing algorithm or the like uses the computation of the sum of the light amounts concerning discrete points instead of the integral term.

Further, the mirror reflection component and diffuse reflection component are treated consistently in the rendering equation 1, whereas the radiosity algorithm generally handles the diffuse reflection component.

Let us now consider the light transmission in one closed area. It is assumed that every shooting and reflection in the closed area are the ideal diffusion.

The light shot from one surface consists of self-shooting light, reflection light coming from another surface and transmission light. The amount of light shot from one surface is therefore determined by the geometric relation among all the surfaces and the amounts of light shot from all the surfaces.

From the above, the rendering equation 1 can be rewritten to a radiosity equation concerning each surface as expressed in an equation 2. The equation 2 is the simultaneous linear equation that represents the amount of energies of all the lights shot from one surface i of interest among a plurality of surfaces or the radiosity Bi (energy/unit area) on that surface i.

$$B_i = E_i + \rho_i \Sigma B_j F_{ij} \quad (2)$$

where $E_i$ is the initial value of the radiosity of the surface i or the shooting radiosity, $\rho_i$ is the reflectance on the surface i, and $F_{ij}$ is the ratio of the radiosity of the surface j which reaches the surface i or the form factor.

In the equation 2, since the shooting radiosity $E_i$ and the reflectance $\rho_i$ are known, if the form factor $F_{ij}$ is obtained, the radiosity $B_i$ can be acquired.

The acquisition of the radiosity using the equation 2 however raises the following two problems.

(1) Because of the same radiosity value $B_i$ in any point within a surface, no shade is given to the area inside the same surface.

(2) Actually, a surface is often expressed by a plurality of polygons. In this case, if one polygon is simply treated as one surface and the radiosity for a plurality of surfaces corresponding to a plurality of polygons is computed, there occurs the difference in the radiosity value at the interface of two polygons whose radiosity values differ from each other.

To solve those two shortcomings, the following schemes have been used.

(1) As a solution to the first problem, the area within a surface is segmented to minute parts and the radiosity is computed for each minute segment. In this case, however, when the number of the minute segments becomes doubled, for example, the number of form factors $F_{ij}$ becomes quadruplicated. To suppress an increase in the number of the minute segments, therefore, the levels of segmentation at the time of gathering light and shooting light are adjusted not to increase the amount of computation of the radiosity.

(2) As a solution to the second problem, link information between adjoining polygons is managed in such a manner that when the original surface is the same, surfaces corresponding to even different polygons are treated as the same surface based on the link information.

The relation between the aforementioned surface and polygons describing this surface will be described below. Conventionally, there are various schemes to describe the original surface.

A recessed polygon shown in FIG. 2A is a figure which is often treated as the shape of a wall cut away as the shape of, for example, a door in computing the radiosity. There is more than one way to describe such a figure.

For example, the figure is described as the recessed polygon with polygonal elements as shown in FIG. 2B.

The figure may also be described with triangle strip elements as shown in FIG. 2C.

When a change in the radiosity value of this surface is simple one, the radiosity value obtained becomes the same whether the figure is described with the polygonal elements or the triangle strip elements. Because the radiosity value normally varies in a complicated manner, the radiosity values obtained by those two methods differ from each other. The description scheme is often designated by a user, so that the target surface should not necessarily be described by the appropriate scheme for the computation of the radiosity and the results often become different from expected.

Particularly, if a very long and sharp triangle is formed when a surface of a recessed polygonal shape is described with triangle strip elements as shown in FIG. 2C, the radiosity value of that portion becomes very small and becomes considerably different from the radiosity value that is computed using the polygonal elements as shown in FIG. 2B.

To avoid such a shortcoming and compute the accurate radiosity, it is necessary to surely manage the link relations among individual minute surfaces in a polygon and among polygons.

When a target surface has a complicated shape, however, it is extremely difficult to segment the surface to minute portions while properly keeping the aforementioned link relations. Accordingly, such a possible variation in radiosity undesirably reduces the precision of the result of computing the radiosity, i.e., the quality of the final image to be drawn.

The link information of surfaces are associated with linked surfaces or directly adjoining surfaces, and the radiosity should be computed separately for a plurality of independent surfaces even when they lie on the same plane. It is therefore difficult to sufficiently decrease the number of surfaces to undergo the computation based on the link information, resulting in a longer processing time. What is more, as the link information increases in accordance with the segmentation of a surface, a greater memory capacity is required.

SUMMARY OF THE INVENTION

Accordingly, it is an object of the present invention to provide a radiosity-algorithm based drawing method and drawing system using which can improve the quality of the result of computing the radiosity and can reduce the processing time in the computation of the radiosity and the memory capacity.

According to the first aspect of this invention, there is provided a radiosity-algorithm based drawing method of obtaining a converged value of a radiosity indicative of an intensity of light energy on each surface by repeating exchange of light energy among a plurality of surfaces for a predetermined number of times, and associating luminance to radiosity of the plurality of surfaces to form a radiosity image, which method comprises:

a positional-information setting step of segmenting each of the plurality of surfaces to a plurality of polygons and defining the each surface based on the segmented polygons, and setting information indicative of a position of one or more points on each of the polygons on a two-dimensional coordinate system in each surface as positional information of the each polygon on the two-dimensional coordinate system;

a map processing step of performing a process to form a plurality of radiosity maps indicative of a correlation between the positional information of each polygon and a pixel value equivalent to the radiosity at the position with respect to the plurality of surfaces; and a map referring/drawing step of referring the plurality of radiosity maps and reading the pixel value corresponding to the each positional information from the radiosity map corresponding to the each surface to draw a radiosity image.

The positional-information setting step may set, as the position information, map coordinate values in coordinates of one of the radiosity maps associated with each vertex of the each polygon on the two-dimensional coordinate system.

The positional-information setting step may include an identifier setting step of setting an identifier for each of the polygons of the each surface to identify the radiosity map to which the polygon is to refer; and the map referring/drawing step may include a map selecting step of selecting the radiosity map associated with the identifier set by the identifier setting step.

The positional-information setting step may include:

an area computing step of computing an area of each of the polygons;

a polygon sorting step of sorting the plurality of polygons in an order of area sizes using results of computation in the area computing step;

an identifier setting step of extracting the plurality of polygons one by one in an sorting order in the polygon sorting step and grouping two or more polygons having similar surface directions and positions for a same identifier;

a map-information computing step of computing a position, direction and size of the radiosity map based on information of a position and direction of a surface which refers to a same radiosity map and is grouped for the same identifier; and a map-coordinate setting step of obtaining map coordinate values of vertices of each polygon based on the position, direction and size of the radiosity map computed in the map-information computing step.

The map processing step may include:

a map defining step of defining a plurality of radiosity maps including at least one shooting radiosity map and at least one gathering radiosity map;

a buffer-data producing step of producing identifier buffer data including map identifiers for individual pixels constituting an identifier buffer storing map identifiers for identifying the at least one gathering radiosity map for individual pixels of a two-dimensional screen with the at least shooting radiosity map taken as a view point, based on vertex coordinate values and vertex map coordinate values of each of the polygons and identifiers of the radiosity maps to which the polygons are to refer;

an identifier-buffer forming step of storing a map identifier for each pixel produced in the buffer-data producing step to form the identifier buffer; and a map updating step of updating data of each of the at least one gathering radiosity map according to radiosity information of the at least one shooting radiosity map based on the map identifier for each pixel stored in the identifier buffer.

The buffer-data producing step may include:

a shooting radiosity map selecting step of selecting one of the at least one shooting radiosity map;

a transform-matrix computing step of setting a plurality of two-dimensional screens constituting a plurality of fields of view around a position of the one shooting radiosity map selected in the shooting radiosity map selecting step, and obtaining a plurality of transform matrices for the plurality of fields of view;

a coordinate transforming step of performing coordinate transformation to convert coordinate values of each vertex of each polygon using the transform matrix obtained in the transform-matrix computing step; and a pixel developing step of developing each polygon to pixels based on the map coordinate values of vertices of each polygon and the vertex coordinate values resulting from the coordinate transformation.

The map updating step may include:

a gathering map selecting step of reading each pixel identifier stored in the identifier buffer and selecting a gathering radiosity map corresponding to the pixel identifier;

a form-factor computing step of obtaining a form factor representing a ratio of radiosity reaching a surface corresponding to the gathering radiosity map from a surface corresponding to the shooting radiosity map in accordance with a position corresponding to the pixel identifier; and a radiosity-change computing step of multiplying the form factor, obtained in the form-factor computing step, by a pixel value stored in the shooting radiosity map to thereby obtain an amount of a change in radiosity in the gathering radiosity map corresponding to the pixel identifier.

The map processing step may include:

a map control step of selectively allocating a plurality of radiosity maps to a plurality of map updating sections and transferring the plurality of radiosity maps to the map updating sections; and a parallel updating step of updating the plurality of radiosity maps, allocated in the map control step, in parallel.

The map control step may include:

a stay-resident allocation step of causing the radiosity maps, allocated in the plurality of map updating sections, to stay resident; and a writing-back step of writing updating results back to the radiosity maps at a time of referring to the radiosity maps in the map referring/drawing step.

The map referring/drawing step may include:

a drawing control step of segmenting a figure corresponding to each of the plurality of surfaces to a plurality of figures, obtaining radiosity values corresponding to coordinate information of the plurality of figures by referring to the radiosity maps, and supplying the radiosity values to a plurality of figure drawing sections; and a figure drawing step of drawing figures in parallel in the plurality of figure drawing sections by using the radiosity values of the plurality of figures supplied in the drawing control step.

The drawing control step may include:

a figure segmenting step of segmenting a figure corresponding to each of the plurality of surfaces to a plurality of figures to obtain coordinate information of the plurality of figures; and a radiosity-value computing step of obtaining radiosity values corresponding to coordinate information of the plurality of figures based on the radiosity maps.

The map processing step may form a plurality of radiosity maps including radiosity maps of front and back sides of each of the plurality of surfaces, and the drawing control step may further include a front and back determining step of determining whether a radiosity map in a given field of view is for a front side or back side of an associated surface from a front and back relationship of the radiosity map in the given field of view so as to skip a process for a radiosity map corresponding to figure drawing of the back side of the surface.

The radiosity-value computing step may further include an interpolation step of obtaining the radiosity values through interpolation in order to improve a precision of a correlation between the figures and the radiosity maps.

According to the second aspect of this invention, there is provided a radiosity-algorithm based drawing apparatus for obtaining a converged value of a radiosity indicative of an intensity of light energy on each surface by repeating exchange of light energy among a plurality of surfaces for a predetermined number of times, and associating luminance to radiosity of the plurality of surfaces to form a radiosity image, which apparatus comprises:

a positional-information setting section for segmenting each of the plurality of surfaces to a plurality of polygons and defining the each surface based on the segmented polygons, and setting information indicative of a position of one or more points on each of the polygons on a two-dimensional coordinate system in the each surface as positional information of the each polygon on the two-dimensional coordinate system;

a map processing section for performing a process to form a plurality of radiosity maps indicative of a correlation between the positional information of the each polygon and a pixel value equivalent to the radiosity at the position with respect to the plurality of surfaces;

a map storage for storing the plurality of radiosity maps processed by the map processing section; and a map referring/drawing section for referring the plurality of radiosity maps and reading the pixel value corresponding to the each positional information from the radiosity map corresponding to the each surface to draw a radiosity image.

The positional-information setting section may set, as the position information, map coordinate values in coordinates of one of the radiosity maps associated with each vertex of the each polygon on the two-dimensional coordinate system.

The positional-information setting section may include an identifier setting section for setting an identifier for each of the polygons of the each surface to identify the radiosity map to which the polygon is to refer; and the map referring/drawing section may include a map selecting section for selecting the radiosity map associated with the identifier set by the identifier setting section.

The identifier setting section may set a same identifier for a plurality of polygons indicating one or more surfaces among the plurality of surfaces.

The identifier setting section may group a plurality of polygons constituting one or more surfaces among the plurality of surfaces based on information of at least one of the position of each of the plurality of surfaces and the direction of the each surface, and set the same identifier for the grouped polygons.

The positional-information setting section may include:

an area computing section for computing an area of each of the polygons;

a polygon sorting section for sorting the plurality of polygons in an order of area sizes using results of computation in the area computing section;

an identifier setting section for extracting the plurality of polygons one by one in an sorting order in the polygon sorting section and grouping two or more polygons having similar surface directions and positions for a same identifier;

a map-information computing section for computing a position, direction and size of the radiosity map based on information of the position and direction of a surface which refers to a same radiosity map and is grouped for the same identifier; and a map-coordinate setting section for obtaining map coordinate values of vertices of each polygon based on the position, direction and size of the radiosity map computed in the map-information computing section.

The map referring/drawing section may include:

a coordinate transforming section for converting coordinate values of each vertex of the plurality of polygons of a first coordinate system to coordinate values of a second coordinate system based on given field-of-view data;

a pixel developing section for developing the plurality of polygons to pixels to obtain pixel map coordinate values corresponding to individual pixels based on the coordinate values of individual vertices of the second coordinate system transformed in the coordinate transforming section; and a pixel-value extracting section for extracting the pixel values corresponding to the pixel map coordinate values from the radiosity map for individual pixel map coordinate values obtained in the pixel developing section.

The map referring/drawing section may include:

a coordinate transforming section for converting coordinate values of each vertex of the plurality of polygons of a first coordinate system to coordinate values of a second coordinate system based on given field-of-view data;

a polygon segmenting section for segmenting each of the plurality of polygons into a plurality of minute polygons based on the field-of-view data and vertex map coordinate values and vertex coordinate values corresponding to vertices of polygons, and obtaining vertex map coordinate values and vertex coordinate values of each of the segmented minute polygons;

a pixel-value extracting section for reading the pixel values corresponding to the pixel map coordinate values from the radiosity map for individual vertex map coordinate values computed in the polygon segmenting section; and a pixel developing section for developing the plurality of polygons to pixels based on the coordinate values of individual vertices of the second coordinate system transformed in the coordinate transforming section, and obtaining a luminance value corresponding to each developed pixel based on the pixel values read in the pixel-value extracting section.

The map processing section may include:

a map defining section for defining the plurality of radiosity maps as at least one shooting radiosity map and at least one gathering radiosity map;

an identifier buffer for storing map identifiers for individual pixels for identifying the gathering radiosity map for each pixel of a two-dimensional screen with the shooting radiosity map as a view point;

a buffer-data producing section for producing identifier buffer data including map identifiers for the individual pixels to be stored in the identifier buffer, based on vertex coordinate values and vertex map coordinate values of each of the polygons and identifiers of the radiosity maps to which the polygons are to refer; and a map updating section for updating data of each of the at least one gathering radiosity map according to radiosity information of the at least one shooting radiosity map based on the map identifier for each pixel stored in the identifier buffer.

The buffer-data producing section may include:

a shooting radiosity map selecting section for selecting one of the at least one shooting radiosity map;

a transform-matrix computing section for setting a plurality of two-dimensional screens constituting a plurality of fields of view around a position of the one shooting radiosity map selected in the shooting radiosity map selecting section, and obtaining a plurality of transform matrices for the plurality of fields of view;

a coordinate transforming section for performing coordinate transformation to convert coordinate values of each vertex of each polygon using the transform matrix obtained in the transform-matrix computing section; and a pixel developing section for developing each polygon to pixels based on the map coordinate values of vertices of each polygon and the vertex coordinate values resulting from the coordinate transformation.

The map updating section may include:

a gathering map selecting section for reading each pixel identifier stored in the identifier buffer and selecting a gathering radiosity map corresponding to the pixel identifier;

a form-factor computing section for obtaining a form factor representing a ratio of radiosity reaching a surface corresponding to the gathering radiosity map from a surface corresponding to the shooting radiosity map in accordance with a position corresponding to the pixel identifier; and a radiosity-change computing section for multiplying the form factor, obtained in the form-factor computing section, by a pixel value stored in the shooting radiosity map to thereby obtain an amount of a change in radiosity in the gathering radiosity map corresponding to the pixel identifier.

The map updating section may further include:

a transform-matrix computing section for obtaining a transform matrix for converting a pixel position of the identifier buffer to pixel map coordinate values of the gathering radiosity map based on positional information of the shooting radiosity map and positional information of the gathering radiosity map; and a pixel-map coordinate value computing section for converting the pixel position of the identifier buffer to the pixel map coordinate values of the gathering radiosity map using the transform matrix obtained in the transform-matrix computing section.

The map processing section may include:

a plurality of parallel map updating sections for updating the radiosity maps respectively; and a map control section for allocating a plurality of radiosity maps to the plurality of map updating sections selectively and in parallel and supplying the plurality of radiosity maps to the map updating sections.

Each of the plurality of map updating sections may include a map holding section for holding a radiosity map for a updating process; and the map control section may include:

a stay-resident allocation section for causing the radiosity maps, allocated in the plurality of map updating sections, to stay resident in the map holding sections; and a writing-back section for writing updating results back to the map storage at a time the map referring/drawing section refers to the radiosity maps.

When there is no space in the map updating sections, the map control section may write results of updating at least one radiosity map staying resident in the updated map updating sections back to the map storage and may allocate a new radiosity map to the map updating sections.

The map referring/drawing section may include:

a plurality of parallel figure drawing sections for drawing figures using radiosity values, respectively; and a drawing control section for segmenting a figure corresponding to each of the plurality of surfaces to a plurality of figures, obtaining radiosity values corresponding to coordinate information of the plurality of figures by referring to the radiosity maps, and supplying the radiosity values in parallel to the plurality of figure drawing sections.

The drawing control section may include:

a figure segmenting section for segmenting a figure corresponding to each of the plurality of surfaces to a plurality of figures to obtain coordinate information of the plurality of figures; and a radiosity-value computing section for obtaining radiosity values corresponding to coordinate information of the plurality of figures based on the radiosity maps.

The map processing section may form a plurality of radiosity maps including radiosity maps of front and back sides of each of the plurality of surfaces, and the drawing control section may further include a front and back determining section for determining whether a radiosity map in a given field of view is for a front side or back side of an associated surface from a front and back relationship of the radiosity map in the given field of view so as to skip a process for a radiosity map corresponding to figure drawing of the back side of the surface.

The radiosity-value computing section may further include an interpolation section for obtaining the radiosity values through interpolation in order to improve a precision of a correlation between the figures and the radiosity maps.

According to this invention, the radiosity-algorithm based drawing method and apparatus of obtaining the converged value of the radiosity indicative of an intensity of light energy on each surface by repeating exchange of light energy among a plurality of surfaces for a predetermined number of times, and associating luminance to the radiosity of the plurality of surfaces to form a radiosity image, segment each of the plurality of surfaces to a plurality of polygons and defining the each surface based on the segmented polygons, set information indicative of a position of one or more points on each of the polygons on a two-dimensional coordinate system in the each surface as positional information of the each polygon on the two-dimensional coordinate system, form a plurality of radiosity maps indicative of a correlation between the positional information of the each polygon and a pixel value equivalent to the radiosity at the position with respect to the plurality of surfaces, and refer to the radiosity maps and read the pixel value corresponding to the each positional information from the radiosity map corresponding to the each surface to draw a radiosity image. Accordingly, it is possible to improve the quality of the result of computing the radiosity and reduce the processing time in the computation of the radiosity and the memory capacity.

In the drawing method and apparatus of this invention using the radiosity algorithm, a plurality of map updating sections for updating the radiosity maps may be provided, so that a plurality of radiosity maps are selectively allocated to the map updating sections and the radiosity maps are updated in parallel in the map updating sections. This structure can ensure the efficient updating of radiosity maps and the efficient formation of the radiosity maps.

Further, in the drawing method and apparatus of this invention using the radiosity algorithm, a plurality of parallel figure drawing sections for drawing figures using radiosity values may be provided, a figure corresponding to each of the plurality of surfaces may be segmented to a plurality of figures, radiosity values corresponding to coordinate information of the plurality of figures may be obtained by referring to the radiosity maps, and figures may be drawn in parallel in the figure drawing sections. This structure allows a radiosity image to be drawn efficiently by referring to the radiosity maps.

BRIEF DESCRIPTION OF THE DRAWINGS

Other objects and advantages of the invention will become apparent during the following discussion in conjunction with the accompanying drawings, in which:

FIGS. 26A through 26E are exemplary diagrams for explaining radiosity interpolation in the system in FIG. 21.

DETAILED DESCRIPTION OF THE PREFERRED EMBODIMENTS

Drawing methods and apparatus using a radiosity algorithm according to preferred embodiments of the present invention will now be described with reference to the accompanying drawings.

First Embodiment

Figure 1:
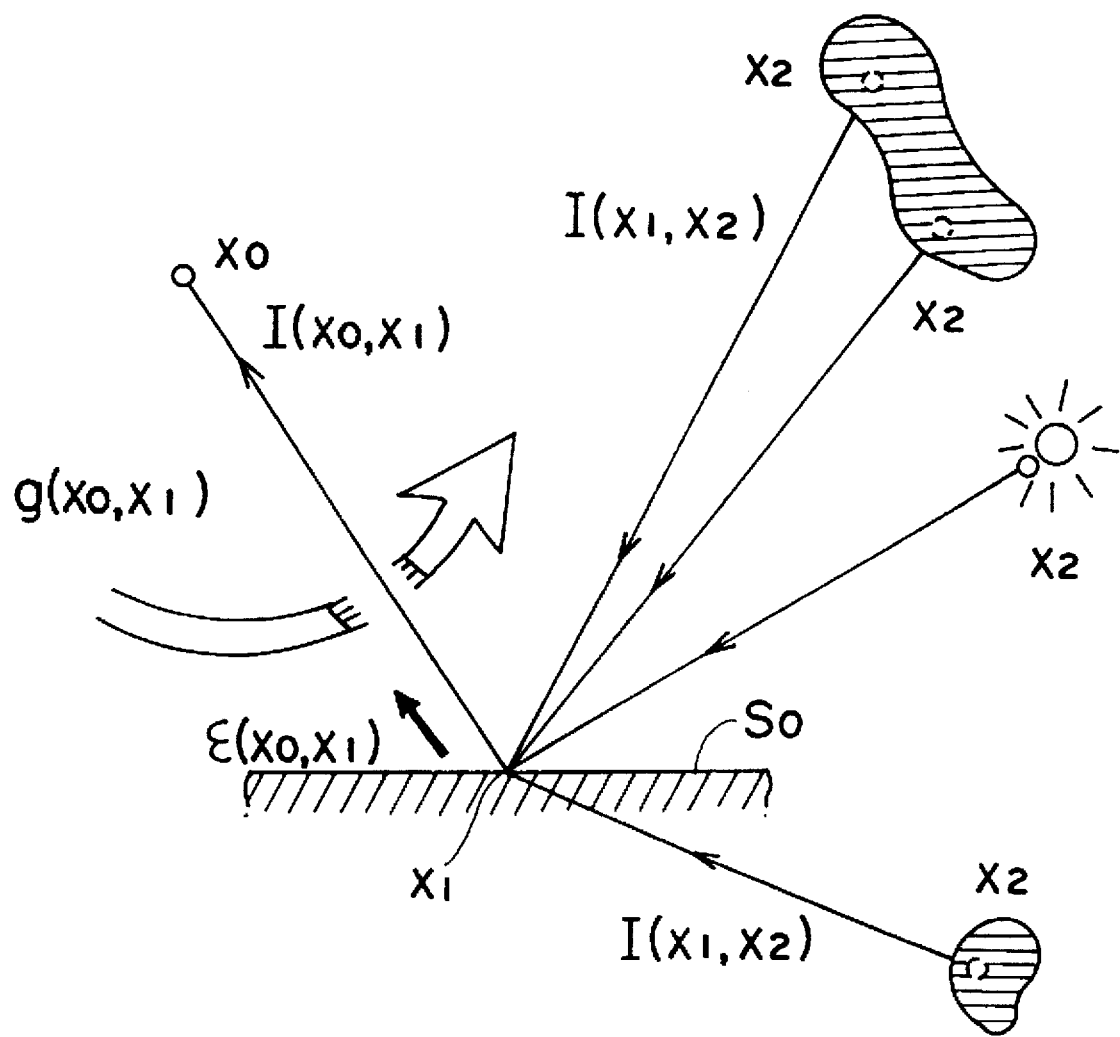
FIG. 1 is an exemplary diagram for explaining a radiosity algorithm.
Figure 2A:
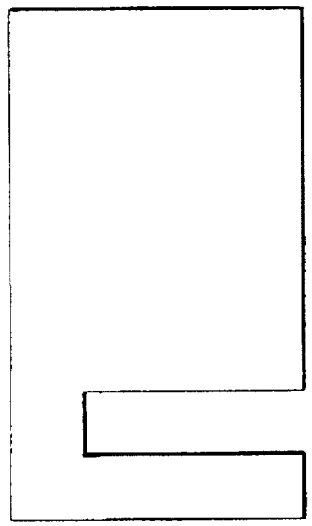
FIGS. 2A through 2C are exemplary diagrams for explaining multifarious ways of expressing shapes.
Figure 2B:
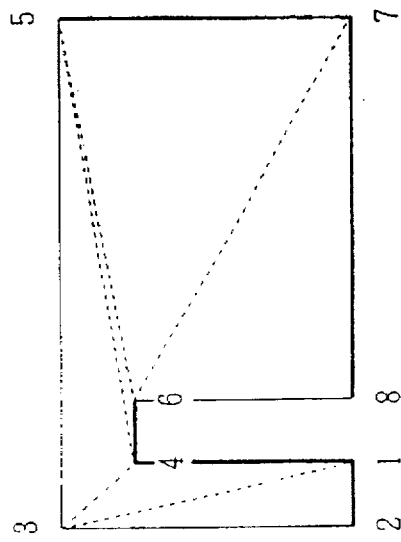
Figure 2C:
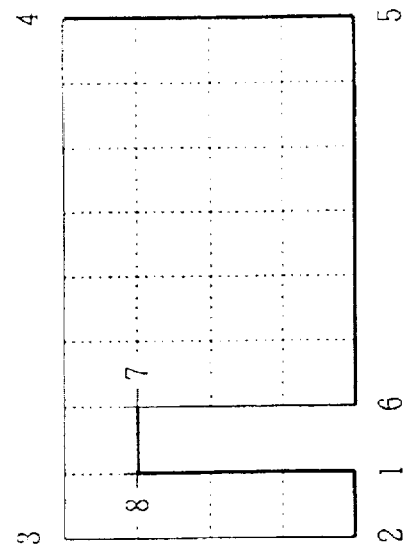
Figure 3:
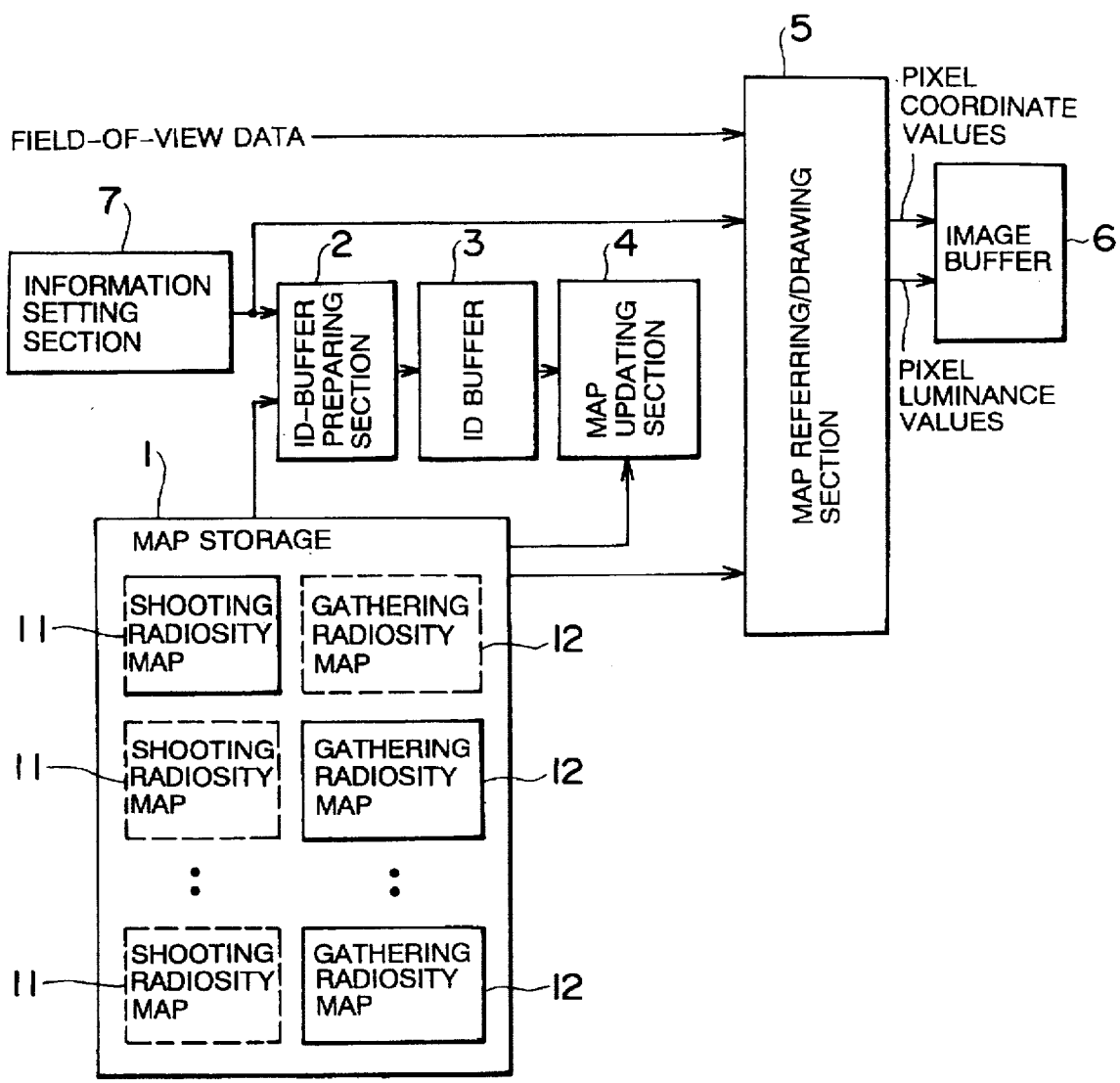
FIG. 3 is a block diagram showing the structure of a drawing system according to a first embodiment of this invention.

FIG. 3 shows the structure of a drawing system according to the first embodiment of this invention.

The drawing system in FIG. 3 comprises a map storage 1, an ID-buffer preparing section 2, an ID buffer 3, a map updating section 4, a map referring/drawing section 5, an image buffer 6 and an information setting section 7.

To define the positions of a plurality of polygons in each of a plurality of surfaces which is expressed by a plurality of segmented polygons, the information setting section 7 sets vertex coordinate values indicative of each vertex of each polygon in each surface on the two-dimensional coordinate system and a vertex st value as the coordinates in the radiosity map of that vertex. A radiosity map is expressed by the ST coordinates which are two-dimensional coordinates with respect to the coordinate axes S and T, and the coordinate values of a point on this ST coordinate system are called an st value. Further, the information setting section 7 sets, for each polygon, an identifier or a map ID for identifying the radiosity map to which that polygon should refer. Therefore, the information setting section 7 provides the ID-buffer preparing section 2 and the map referring/ drawing section 5 with the vertex coordinate values indicative of the vertices of each polygon, the vertex st value and the map ID for each polygon.

The map storage 1 stores a plurality of radiosity maps corresponding to a plurality of surfaces.

One of those radiosity maps is selectively set as a shooting radiosity map 11 for the shooting radiosity in computing the radiosity, and the other radiosity maps (all of the remaining radiosity maps in principle) are set as gathering radiosity maps 12 for the gathering radiosity and the radiosity is computed for every gathering radiosity map 12. Next, another one of the plurality of radiosity maps, i.e., one of the previously-set gathering radiosity maps 12 is selected as the shooting radiosity map 11, and the other radiosity maps are set as the gathering radiosity maps 12 and the radiosity is computed for every gathering radiosity map 12. Based on the result of the computation, the contents of the radiosity maps are updated. Thereafter, a similar operation is repeated for a predetermined number of times.

The shooting radiosity map 11 and gathering radiosity maps 12 in the map storage 1 store radiosity values or pixel values corresponding to the luminance in association with the vertex st values of each polygon. That is, the radiosity map to be stored in the map storage 1 stores information which includes the radiosity map image having the pixel values, the unshot energy map image retaining the value of the gathered energy (radiosity) from another radiosity map, the position of the map, the direction of the map, the size of the map and the resolution of the map. The radiosity map image and the unshot energy map image are expressed in the form of a two-dimensional image of the ST coordinate system.

Based on the vertex coordinate values, the vertex st values and the map ID (map identifier) from the information setting section 7, the ID-buffer preparing section 2 produces the map ID of the polygon, as seen at the time of viewing the shooting radiosity map 11, and, as needed, ID buffer data including the st values, and supplies the ID buffer data to the ID buffer 3. The ID buffer 3 stores the map ID of the polygon, produced by the ID-buffer preparing section 2, and, as needed, ID buffer data including the st values.

Based on the contents of the ID buffer 3, the map updating section 4 obtains the radiosity of each gathering radiosity map 12 from the radiosity of the shooting radiosity map 11 and updates the radiosity maps in the map storage 1. As a result, updated data is written in the radiosity maps in the map storage 1.

The ID-buffer preparing section 2 and the map updating section 4 repeats the updating of the radiosity maps a predetermined number of times while selecting any of a plurality of radiosity maps in the map storage 1 as the shooting radiosity map 11 one by one. Although the number of repetitions is not particularly limited, the updating process is generally repeated until the unshot energy or unshot radiosity becomes zero and a change in the radiosity map image of the radiosity map converges.

The map referring/drawing section 5 is supplied with field-of-view data, and the vertex coordinate values, the vertex st values and map ID, which are set by the information setting section 7, and reads the content of the desired radiosity map from the map storage 1. The map referring/ drawing section 5 maps the radiosity on the individual polygons using the updated radiosity maps in the map storage 1 and then prepares an image as viewed from an arbitrary view point based on the field-of-view data. That is, the map referring/drawing section 5 selects the radiosity map corresponding to the map ID set by the information setting section 7, reads the radiosity value corresponding to each vertex st value stored in the radiosity map, prepares a radiosity image with that radiosity value as the pixel value of a two-dimensional image, and then supplies the radiosity image to the image buffer 6.

The image buffer 6 stores the radiosity image, prepared by the map referring/drawing section 5, as image data including pixel coordinate values and pixel luminance values.

Figure 4:
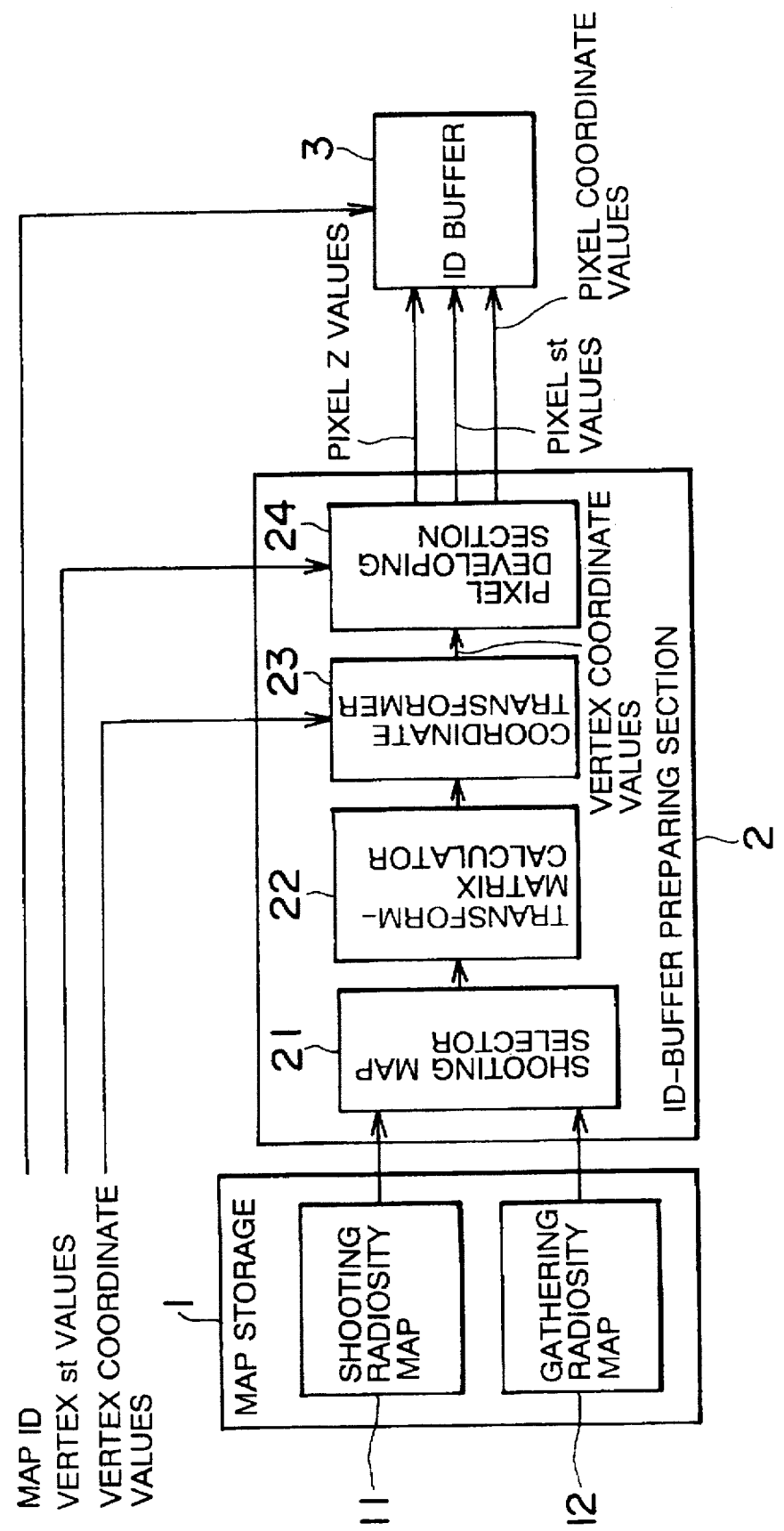
FIG. 4 is a block diagram showing the structure of an ID-buffer preparing section in the system in FIG. 3.

FIG. 4 presents the detailed illustration of the structure of the ID-buffer preparing section 2. The ID-buffer preparing section 2 in FIG. 4 has a shooting map selector 21, a transform matrix calculator 22, a coordinate transformer 23 and a pixel developing section 24.

The shooting map selector 21 selects the shooting radiosity map 11 to be used from the radiosity maps in the map storage 1. Consequently, the other radiosity maps than the selected one become the gathering radiosity maps 12.

The transform matrix calculator 22 constructs a plurality of fields of view around the position equivalent to the shooting radiosity map 11, selected by the shooting map selector 21, as a two-dimensional plane and obtains a plurality of transform matrices for the constructed fields of view.

The coordinate transformer 23 transforms the vertex coordinate values of each polygon to the coordinates on the coordinate system for the fields of view by using the transform matrix obtained by the transform matrix calculator 22.

The pixel developing section 24 develops each polygon to pixels based on the vertex st values of that polygon and the vertex coordinate values transformed by the coordinate transformer 23, removes a hidden surface for the individual developed pixels and supplies the pixel coordinate values and the pixel st values, if necessary, to the ID buffer 3. The pixel developing section 24 may also supply the pixel Z values and pixel ID, which will be discussed later, to the ID buffer 3 in some cases.

The ID buffer 3 stores the map ID of the radiosity map to be referred to for each polygon, the pixel coordinate values and the pixel st values. The pixel st values are stored there when necessary.

Figure 5:
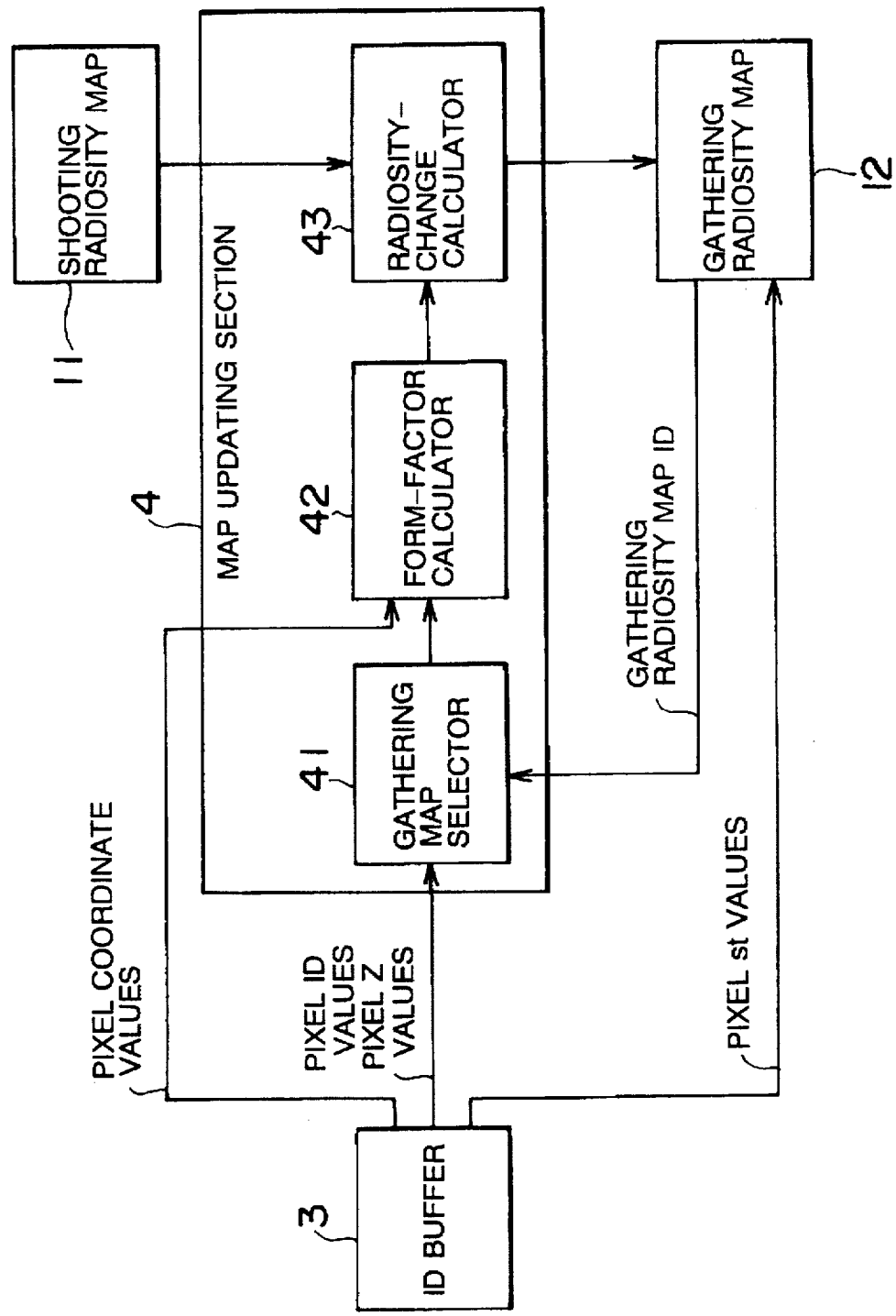
FIG. 5 is a block diagram showing the structure of a map updating section in the system in FIG. 3.

FIG. 5 shows the structure of the map updating section 4.

The map updating section 4 in FIG. 5 has a gathering map selector 41, a form-factor calculator 42 and a radiosity-change calculator 43.

The gathering map selector 41 reads the pixel ID value indicative of the map ID corresponding to each pixel stored in the ID buffer 3 and selects the gathering radiosity map 12 corresponding to that pixel ID value.

The form-factor calculator 42 computes the form factor corresponding to the pixel coordinate values read from the ID buffer 3 based on the map ID of the gathering radiosity map 12 selected by the gathering map selector 41, and gives it to the radiosity-change calculator 43. While each form factor can easily be computed, form factors may be calculated and stored in a table previously so that the desired one can be obtained from that table.

A map ID being written in the ID buffer 3 means that when one sees toward the pixel of interest in the ID buffer 3 from the position of the shooting radiosity map 11, the surface associated with the gathering radiosity map 12 indicated by that map ID is seen. No map ID being written in the ID buffer 3, on the other hand, means that no surface is present in the direction of the pixel of interest in the ID buffer 3 as viewed from the position of the shooting radiosity map 11. With regard to that pixel, therefore, the updating of the gathering radiosity map 12 is interrupted.

The radiosity-change calculator 43 multiplies the form factor, calculated by the form-factor calculator 42, by the unshot energy stored in the shooting radiosity map 11 to compute the amount of a change in radiosity, and stores the amount of a change in radiosity in the gathering radiosity map 12.

Figure 6:
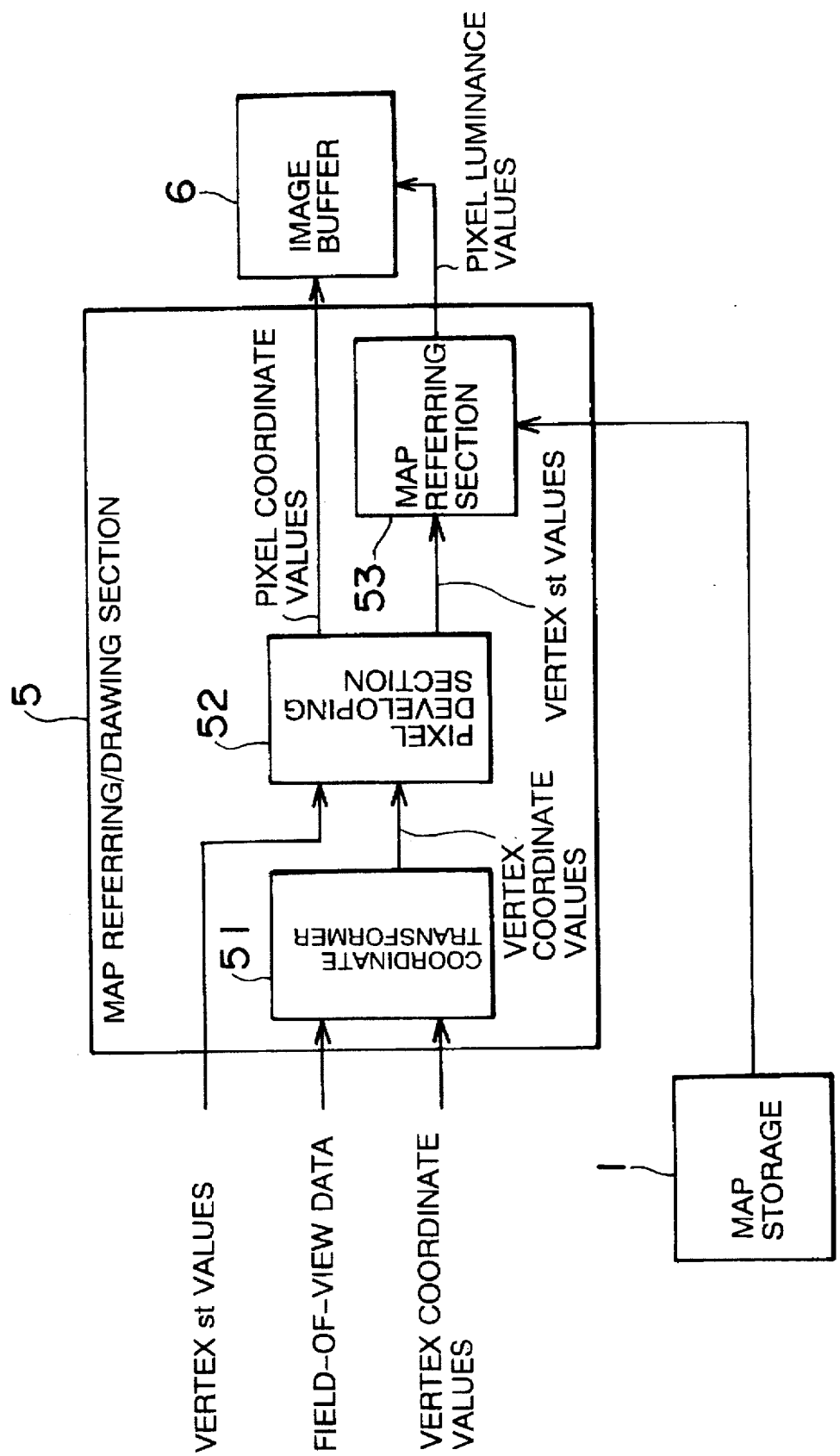
FIG. 6 is a block diagram showing the structure of a map referring/drawing section in the system in FIG. 3.

FIG. 6 shows the structure of the map referring/drawing section 5.

The map referring/drawing section 5 in FIG. 6 has a coordinate transformer 51, a pixel developing section 52 and a map referring section 53.

The coordinate transformer 51 receives the field-of-view data and the vertex coordinate values from the information setting section 7, and performs coordinate transformation on the vertex coordinate values of a polygon based on the field-of-view data. The pixel developing section 52 develops each polygon to pixels based on the vertex coordinate values transformed by the coordinate transformer 51 and the vertex st values from the information setting section 7 to acquire the pixel coordinate values and pixel st values of the individual pixels. The pixel developing section 52 supplies the obtained pixel coordinate values to the image buffer 6.

The map referring section 53 retrieves the pixel luminance values according to the radiosity stored in the associated radiosity map in the map storage 1 based on the pixel st values given from the pixel developing section 52, and supplies the pixel luminance values to the image buffer 6.

The image buffer 6 stores the pixel luminance values from the map referring section 53 as image data in association with the pixel coordinate values given from the pixel developing section 52.

Figure 7:
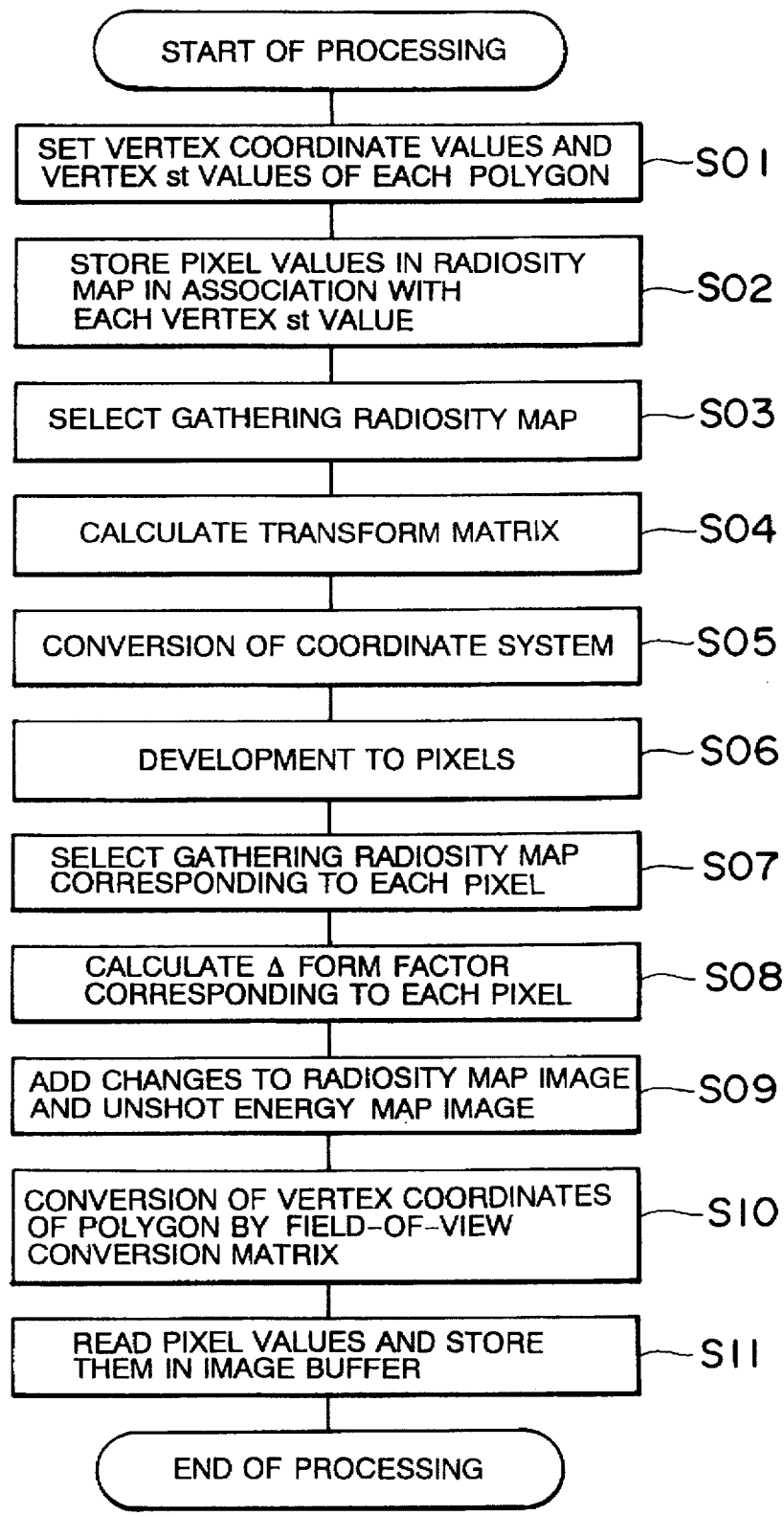
FIG. 7 is a flowchart for explaining the operation of the system in FIG. 3.

The operation illustrating the drawing method in the thus structured drawing system will be described with reference to FIG. 7.

First, the information setting section 7 segments each of a plurality of surfaces to a plurality of polygons, and sets the vertex coordinate values of the individual vertices of each polygon on the two-dimensional coordinate system and the associated vertex st values in the associated radiosity map on the ST coordinate system in order to express the positions of the polygons of each surface (step S01).

Figure 8:
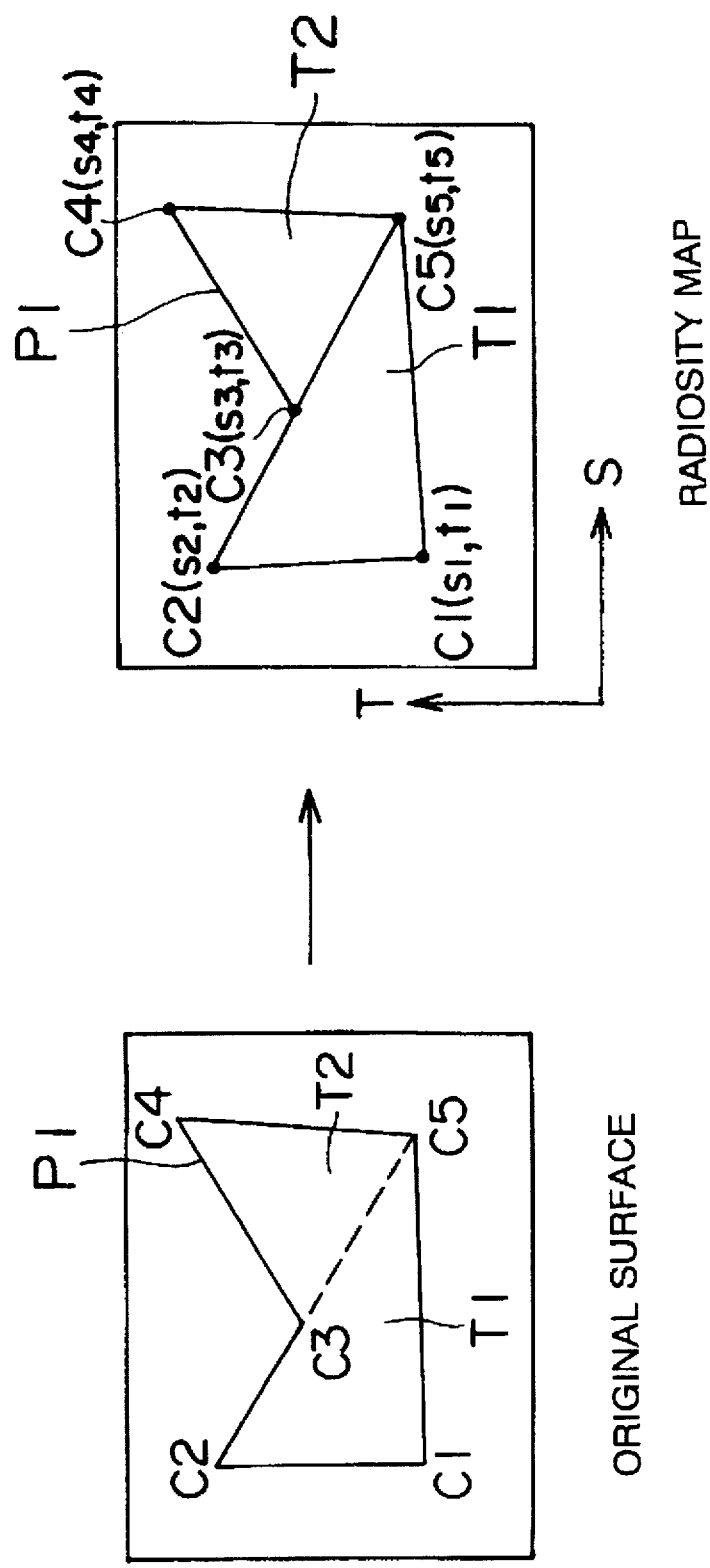
FIG. 8 is a diagram showing polygons resulting from the segmentation of a single surface.
Figure 9:
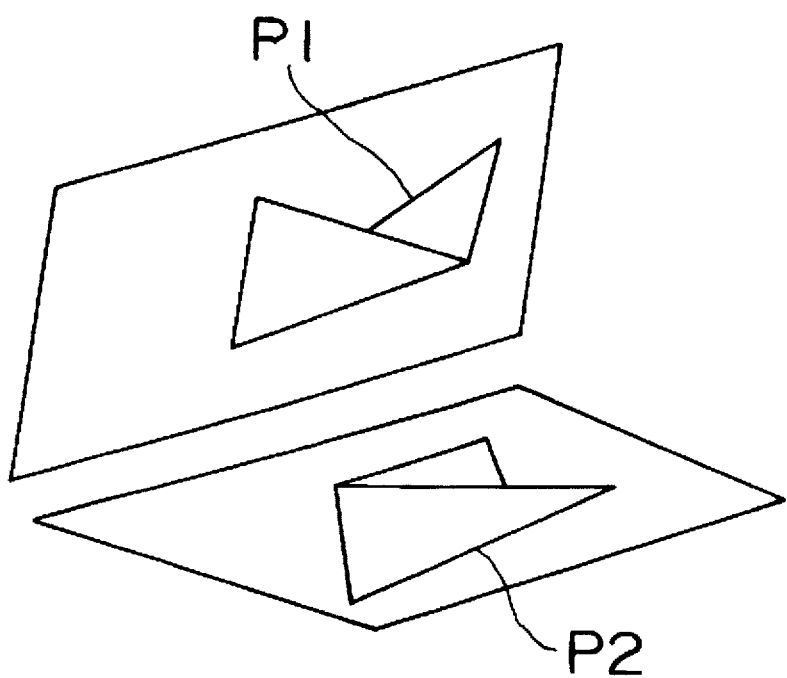
FIG. 9 is a diagram showing polygons resulting from the segmentation of a plurality of surfaces.

For example, a polygon P1 of a single original surface as shown in FIG. 8 is divided to two polygons (triangles) T1 and T2. For the coordinate values of the individual vertices C1 to C5 of the polygons, the associated vertex st values (s1, t1) to (s5, t5) in the associated radiosity map on the ST coordinate system are set. In other words, the vertex coordinate values of each polygon of the original surface correspond, one to one, to the vertex st values on the radiosity map. Then, each of a plurality of surfaces, like polygons P1 and P2 not on the same plane but on different surfaces as shown in FIG. 9, are segmented to polygons and the vertex coordinate values and vertex st values of each polygon are set.

Further, the information setting section 7 also sets the map ID sets, for each polygon, a map ID for identifying the radiosity map to which that polygon should refer. By providing the same ID for a plurality of polygons on the same surface, one surface is associated with a single radiosity map. That is, a plurality of radiosity maps are prepared for each surface.

The pixel values corresponding to the radiosity values are stored in each radiosity map in association with the vertex st values of the each polygon (step S02).

The processing by the ID-buffer preparing section will be executed next.

The shooting map selector 21 selects the shooting radiosity map 11 from the radiosity maps is stored in the map storage 1 (step S03). In selecting the shooting radiosity map 11, the shooting map selector 21 may simply select a plurality of radiosity maps one by one. Alternatively, the shooting map selector 21 may select the radiosity map storing the maximum unshot energy from a plurality of radiosity maps as the shooting radiosity map 11.

The transform matrix calculator 22 constructs a plurality of fields of view around the position of the selected shooting radiosity map 11 as a two-dimensional plane and computes a transform matrix for the constructed fields of view (step S04). For example, the transform matrix calculator 22 calculates a 4×4 transform matrix. The transform matrix is obtained by the product of a view orientation matrix and a view projection matrix.

The view orientation matrix is the transform matrix which converts the view direction to the Z axis with the view point as the origin, and is designed by the parallel movement to the view point and the rotation in the view direction. The view point represents the center of the shooting radiosity map or the properly set sample point in terms of the world coordinates. The view direction is the normal direction of the shooting radiosity map on a front hemi-cube, but, on a side map, it is the direction along the side of the shooting radiosity map. The world coordinate system can be transformed to the view-point coordinate system by means of the view orientation matrix.

The view projection matrix is the perspective projection matrix which projects a point in each of the upper, lower, right and left directions of view within a range of 45 degrees onto the range of the resolution of the image. This view projection matrix allows the view-point coordinate system to be transformed to the device coordinate system (the coordinate system of this device).

The coordinate transformer 23 transforms the vertex coordinate values of a polygon on the world coordinate system to the vertex coordinate values on the device coordinate by using the transform matrix obtained by the transform matrix calculator 22 (step S05).

Based on the individual vertex coordinate values of a polygon on the device coordinate system, the pixel developing section 24 selects pixel coordinate values included in that polygon from the pixel coordinate values stored in the ID buffer 3, and computes the pixel st values for the individual pixel coordinate values (step S06).

The pixel developing may be executed by known typical methods, which include clipping, scan conversion and digital differential analysis (DDA).

Next comes the processing by the map updating section 4.

Based on the pixel Z value or pixel ID value of each pixel stored in the ID buffer 3, the gathering map selector 41 selects the gathering radiosity map 12 corresponding to that pixel (step S07).

There are following two ways to select the gathering radiosity map 12. The first method uses the mentioned pixel ID value. The pixel ID value is compared with the ID's of the gathering radiosity maps 12 to find the one whose ID matches with the pixel ID value. The second method uses the aforementioned pixel Z value. The Z value expected at a pixel point in each gathering radiosity map 12 is computed, and it is compared with the pixel Z values in the ID buffer 3. When there is a radiosity map which matches with the pixel, the Z value and the pixel Z value either match with each other or become very close to each other. For a radiosity map which does not match with the pixel, the Z value in the radiosity map indicates that the pixel is located deeper than one indicated by the pixel Z value. Accordingly, the radiosity map for which the comparison has resulted in coincidence or the Z value and pixel Z value have been determined to be very close to each other is selected.

The form-factor calculator 42 computes the Δ form factor corresponding to each pixel in the ID buffer 3 ("Δ indicates a "change" so that the "Δ form factor indicates a change in the form factor) based on the pixel coordinate values and the gathering radiosity map selected by the gathering map selector 41 (step S08).

The radiosity-change calculator 43 multiplies the unshot energy on the light-shooting surface by the Δ form factor, calculated by the form-factor calculator 42 to compute Δ radiosity (a change in radiosity). Further, the radiosity-change calculator 43 multiplies the Δ radiosity by the area ratio of the surface to obtain Δ unshot energy (a change in unshot energy). The radiosity-change calculator 43 adds the Δ radiosity to the radiosity map image of the gathering map selector 12 and adds the Δ unshot energy to the unshot energy map image of the gathering map selector (step S09). At this time, the position of the pixel to be added on the radiosity map 12 is determined by the pixel st values.

Next comes the processing by the map referring/drawing section 5.

The coordinate transformer 51 receives the field-of-view data and the vertex coordinate values from the information setting section 7, and performs coordinate transformation on the vertex coordinate values of a polygon based on the field-of-view transform matrix obtained from the given field-of-view data (step S10). The pixel developing section 52 operates in substantially the same manner as the pixel developing section 24. The map referring section 53 reads the pixel value at the position in the radiosity map image, which corresponds to the pixel st values, and stores that pixel value at the position corresponding to the associated pixel coordinate values in the image buffer 6 (step S11).

In short, the drawing system in FIG. 3 segments each surface to a plurality of polygons, sets the vertex st values on the associated radiosity map corresponding to the vertex coordinates of each polygon to express the position of each of the polygons on each surface, stores the pixel values equivalent to the radiosity values in a plurality of radiosity maps in association with the vertex st values of the individual polygons, and reads the pixel values corresponding to the individual vertex st values from the radiosity map associated with each surface to form a radiosity image.

In other words, a plurality of polygons are associated with each surface by the set vertex st values, so that even those polygons have complex shapes to be arranged in a complicated manner, the radiosity can be calculated properly and uniformly without depending on the types of the figure elements to be described.

Since a map ID is set for each polygon, it is possible to select the proper radiosity map for each polygon based on the set map ID.

Second Embodiment

Figure 10:
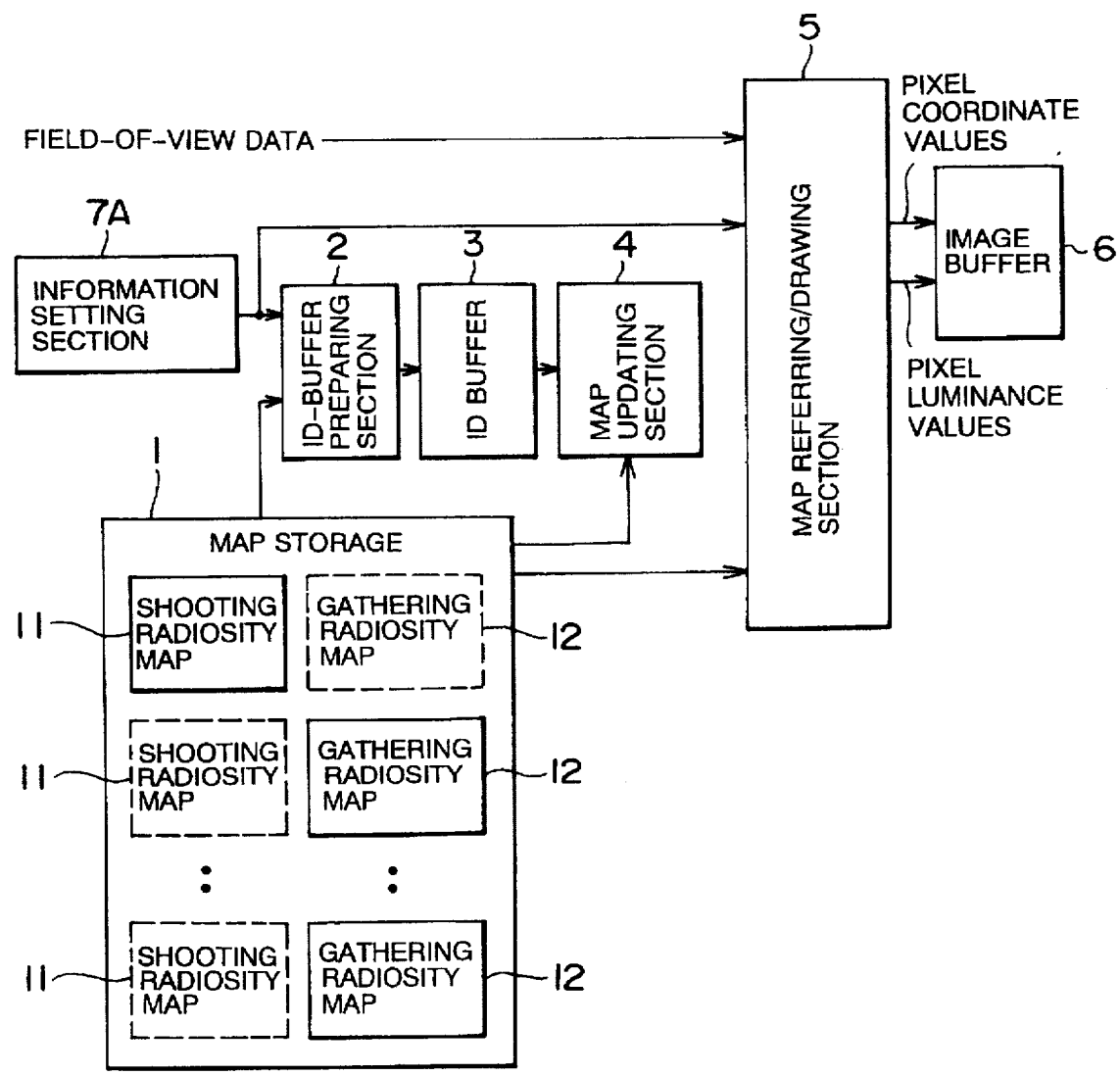
FIG. 10 is a block diagram showing the structure of a drawing system according to a second embodiment of this invention.

FIG. 10 shows the structure of a drawing system according to the second embodiment of this invention. This drawing system is characterized in its information setting section 7A which is different in structure from the information setting section 7 illustrated in FIG. 3.

Figure 11:
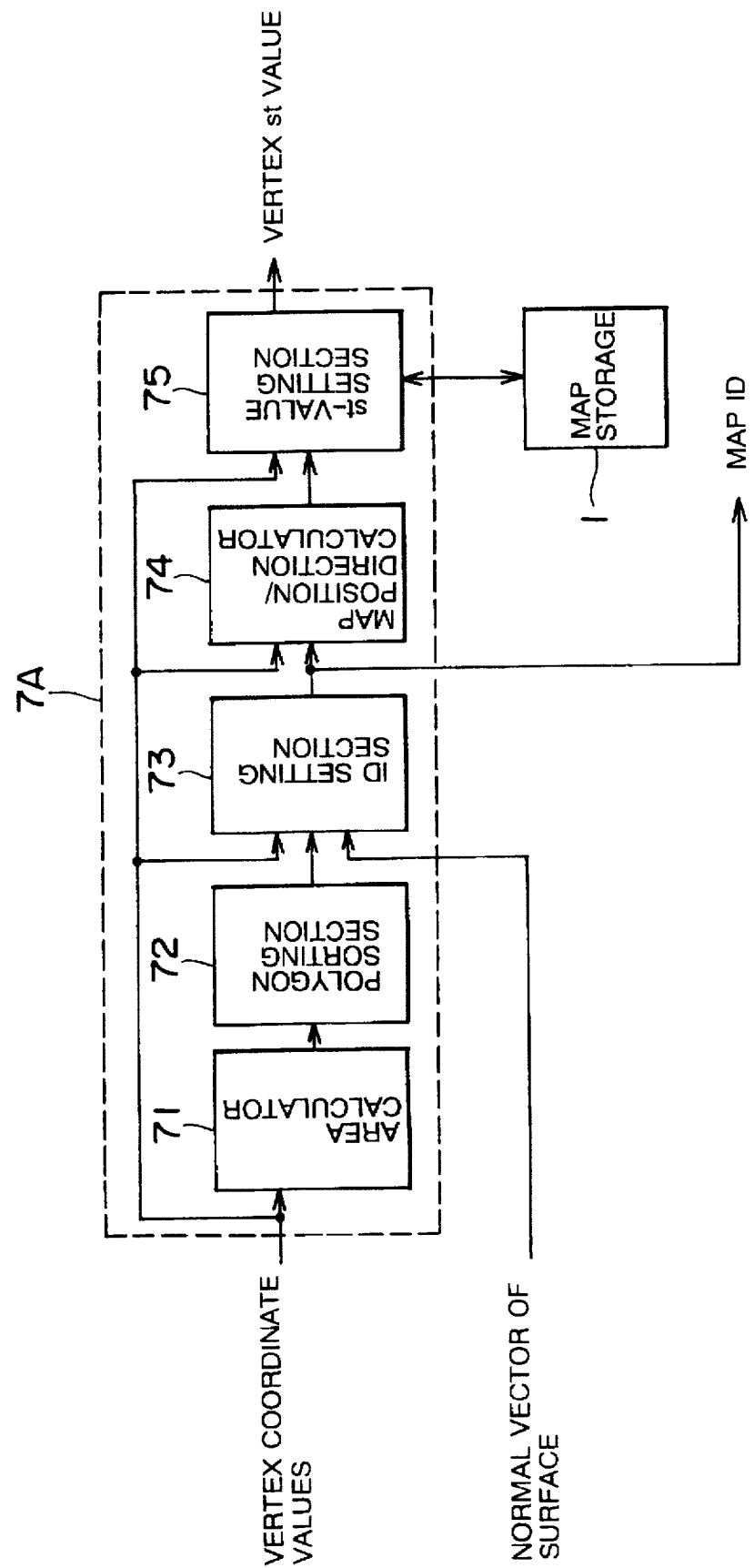
FIG. 11 is a block diagram showing the structure of an information setting section in the system in FIG. 10.

FIG. 11 shows the specific structure of the information setting section 7A in FIG. 10. The information setting section 7A automatically calculates information, such as the vertex st values of a polygon, the map ID indicative of the radiosity map which should be referred to for each polygon, the position of the radiosity map and the direction of the radiosity map, based on the vertex coordinate values and the surface normal vector.

The information setting section 7A in FIG. 11 has an area calculator 71, a polygon sorting section 72, an ID setting section 73, a map position/direction calculator 74 and a st-value setting section 75.

Based on the vertex coordinate values of a plurality of polygons, the area calculator 71 obtains the areas of the individual polygons. Based on the areas of the individual polygons, the polygon sorting section 72 sorts the polygons in the order of larger areas.

In accordance with the order resulting from the sorting performed by the polygon sorting section 73, the ID setting section 73 reads the individual polygons one by one, sets map ID's to the polygons based on the vertex coordinate values and the surface normal vector, and sets the same map ID for those polygons among the read polygons whose surface directions and surface positions are close to one another to group them.

Based on the vertex coordinate values and the map ID's set by the ID setting section 73, the map position/direction calculator 74 obtains the position, direction, size and the like of the associated radiosity map from the information on the position and direction of the surface for which the same map should be referred to.

The st-value setting section 75 calculates the vertex st values of each polygon based on the information on the position, direction, size and the like of the map obtained by the map position/direction calculator 74.

The other structure of the drawing system in FIG. 10 is substantially the same as the corresponding structure shown in FIG. 3. Those portions in FIG. 10 which are denoted by like or same reference numerals as used for the components in FIG. 3 are substantially the same as the corresponding components.

Figure 12:
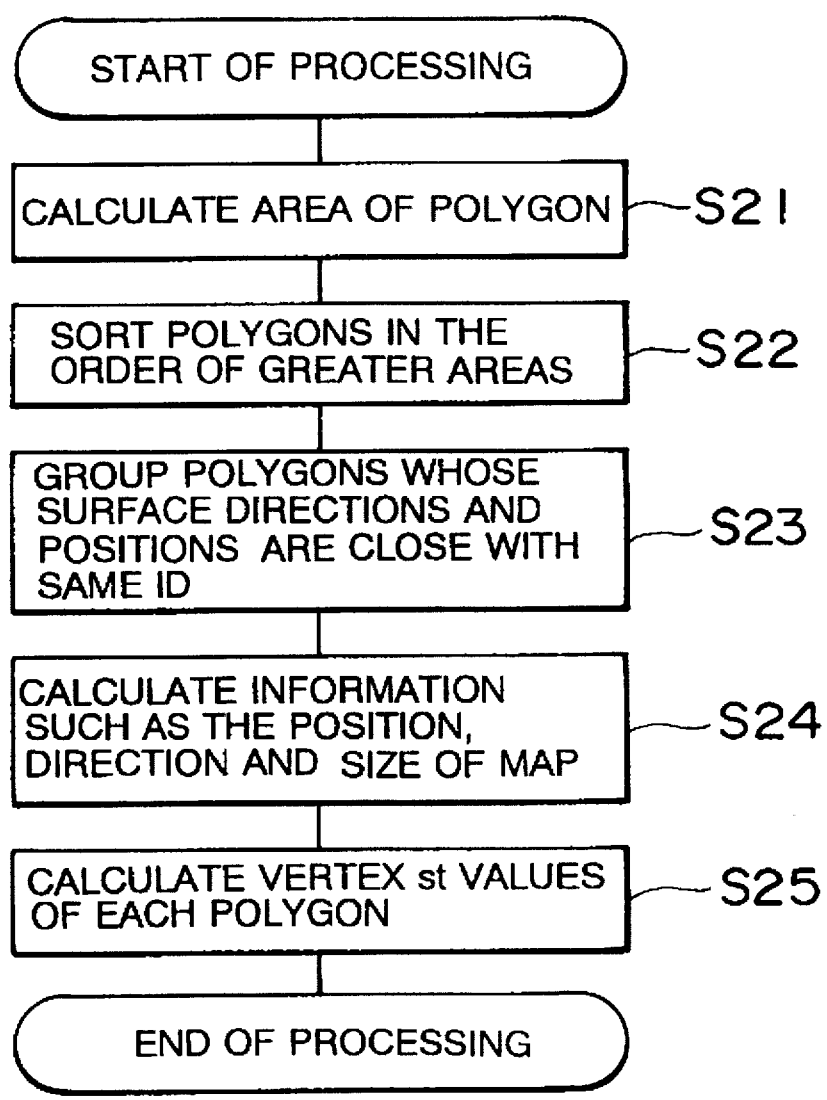
FIG. 12 is a flowchart for explaining the operation of the system in FIG. 10.

With reference to FIG. 12, the operation of the drawing system structured as shown in FIG. 11 will be described below. As the other part of the structure shown in FIGS. 10 and 11 than the information setting section 7A is the same as the one shown in FIGS. 3 through 6, FIG. 12 mainly illustrate the processing associated with the information setting performed by the information setting section 7A.

Based on the vertex coordinate values of a plurality of polygons, the area calculator 71 obtains the areas of the individual polygons (step S21). Based on the areas of the individual polygons, the polygon sorting section 72 sorts the polygons in the order of larger areas (step S22).

The ID setting section 73 reads the individual polygons in the order sorted by the polygon sorting section 73, and sets the same map ID for those polygons among the read polygons whose surface directions and surface positions are the same or close to one another to group those polygons, thus accomplishing the setting of map ID's (step S23).

As polygons are associated with radiosity maps using map ID's, the same radiosity map can be referred to even for surfaces which are not the same in the strict sense.

A delicate irregular surface on the wall or ceiling is often designed finely to improve the quality of the display image. A slightly curved surface, the roundness of the corner of an object and the like are often described in detail as the collection of a plurality of fine polygons whose curves surfaces or surface directions change gradually.

Such a fine irregular surface and a change in the surface direction are just a fraction of the entire image. In this case, if the minute surface of interest is treated as belonging to a large surface having a similar condition, there is not such a significant difference in the result of computing the radiosity. The fine rugged surface and curve may be actually neglected and the entirety of surfaces having similar conditions may be considered as a common surface, thus reducing the number of radiosity maps in use.

Figure 13:
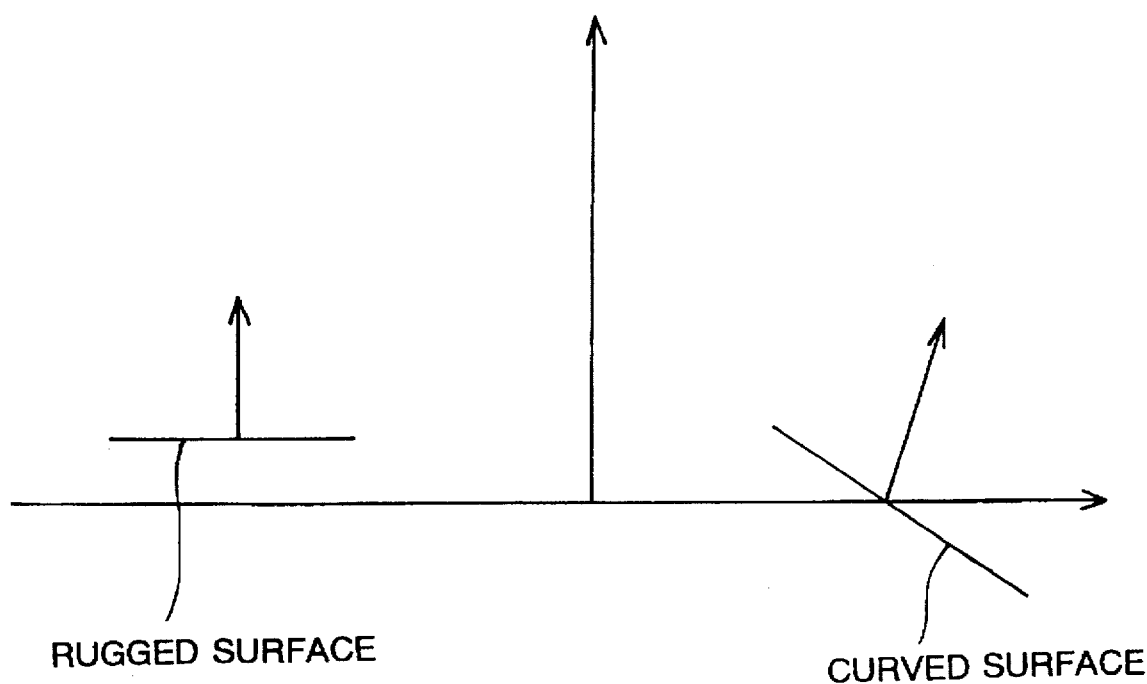
FIG. 13 is a diagram showing the grouping of surfaces.

It is desirable to use the direction of a surface and the position of the surface along the normal direction as the reference in grouping surfaces. The surface direction can permit the measurement of the dimension of the curve of a surface and the roundness of a corner, and the position in the normal direction can permit the measurement of the dimension of the ruggedness of a surface, as shown in FIG. 13.

If there is a minute surface which is left out even by such grouping, this surface is eliminated from the targets for the computation of the radiosity. Such a minute surface does not contribute to the reflection between surfaces much and does not stand out much in the result of drawing an image based on the radiosity due to its small area. It is therefore possible to neglect the error which occurs from the elimination of this minute surface from the targets for the computation of the radiosity.

Next, based on the vertex coordinate values and the map ID's, the map position/direction calculator 74 obtains information on the position, direction, size and the like of the associated radiosity map according to the information on the position and direction of the surface for which the same radiosity map should be referred to (step S24).

The st-value setting section 75 calculates the vertex st values of each polygon based on the information on the position, direction, size and the like of the map obtained by the map position/direction calculator 74 (step S25).

According to the drawing system having the structure as illustrated in FIGS. 10 and 11, the ID setting section 73 of the information setting section 7A groups surfaces using the same map ID based on the directions and positions of surfaces, so that the map referring/drawing section 5 selects a common radiosity map for some surfaces based on the same map ID. Since the common radiosity map is referred to for a plurality of surfaces on the same plane, therefore, the number of radiosity maps to be used can be reduced, thus contributing to the reduction of the memory capacity and the processing time.

Third Embodiment

Figure 14:
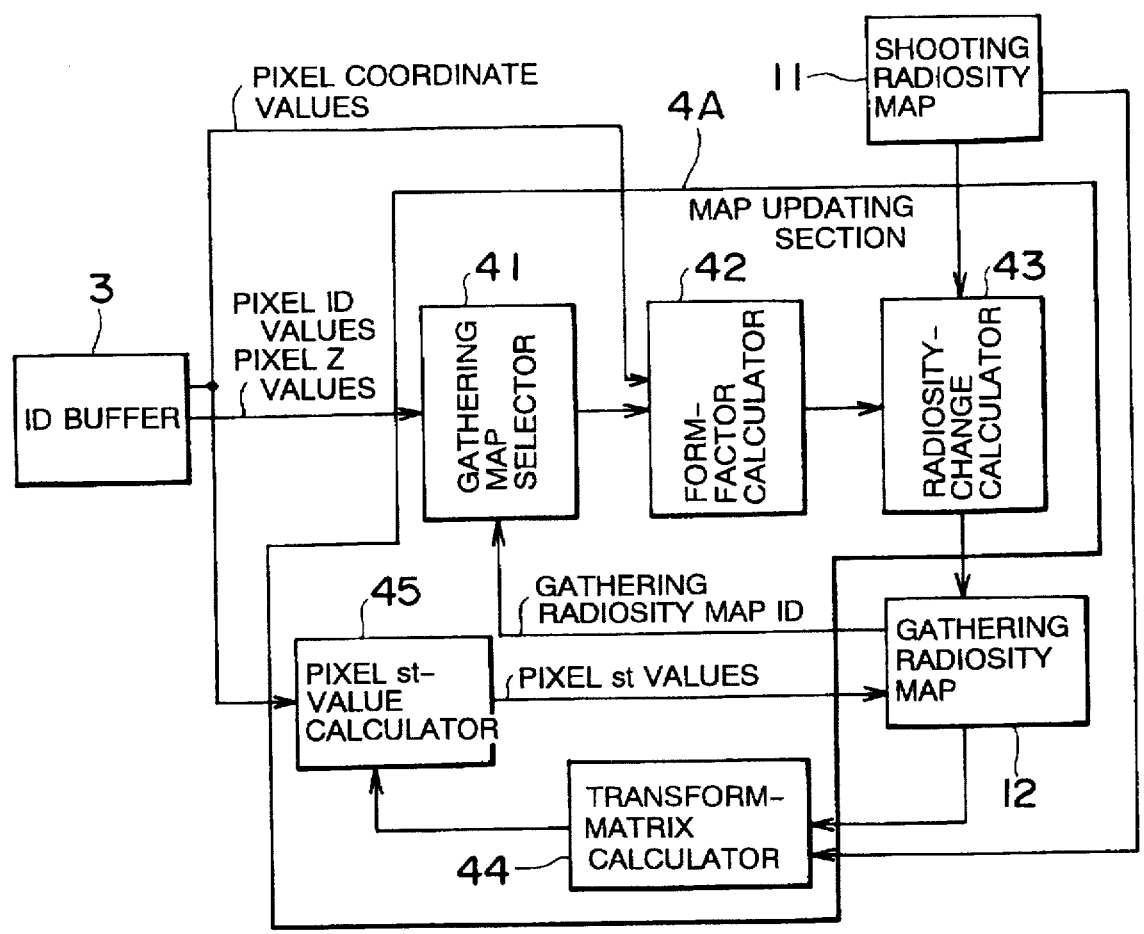
FIG. 14 is a block diagram showing the structure of the essential portions of a drawing system according to a third embodiment of this invention.

FIG. 14 shows the structures of the essential portions of a drawing system according to the third embodiment of this invention. The feature of this drawing system lies in its map updating section 4A having a different structure from that of the map updating section 4 shown in FIG. 3.

The map updating section 4A in FIG. 14 has a gathering map selector 41, a form-factor calculator 42, a radiosity-change calculator 43, a transform-matrix calculator 44 and a pixel st-value calculator 45.

As the gathering map selector 41, form-factor calculator 42 and radiosity-change calculator 43 are basically the same as those shown in FIG. 5, their detailed descriptions will be omitted.

The transform-matrix calculator 44 calculates a transform matrix for converting the pixel coordinate values in the ID buffer 3 to the pixel st values in a gathering map based on the shooting positional information stored in the shooting radiosity map 11 and the gathering map positional information stored in the gathering radiosity map 12 targeted for the computation.

The pixel st-value calculator 45 calculates the pixel st values based on the pixel coordinate values read from the ID buffer 3 and the transform matrix obtained by the transform-matrix calculator 44, and stores them in the gathering radiosity map 12.

Figure 15:
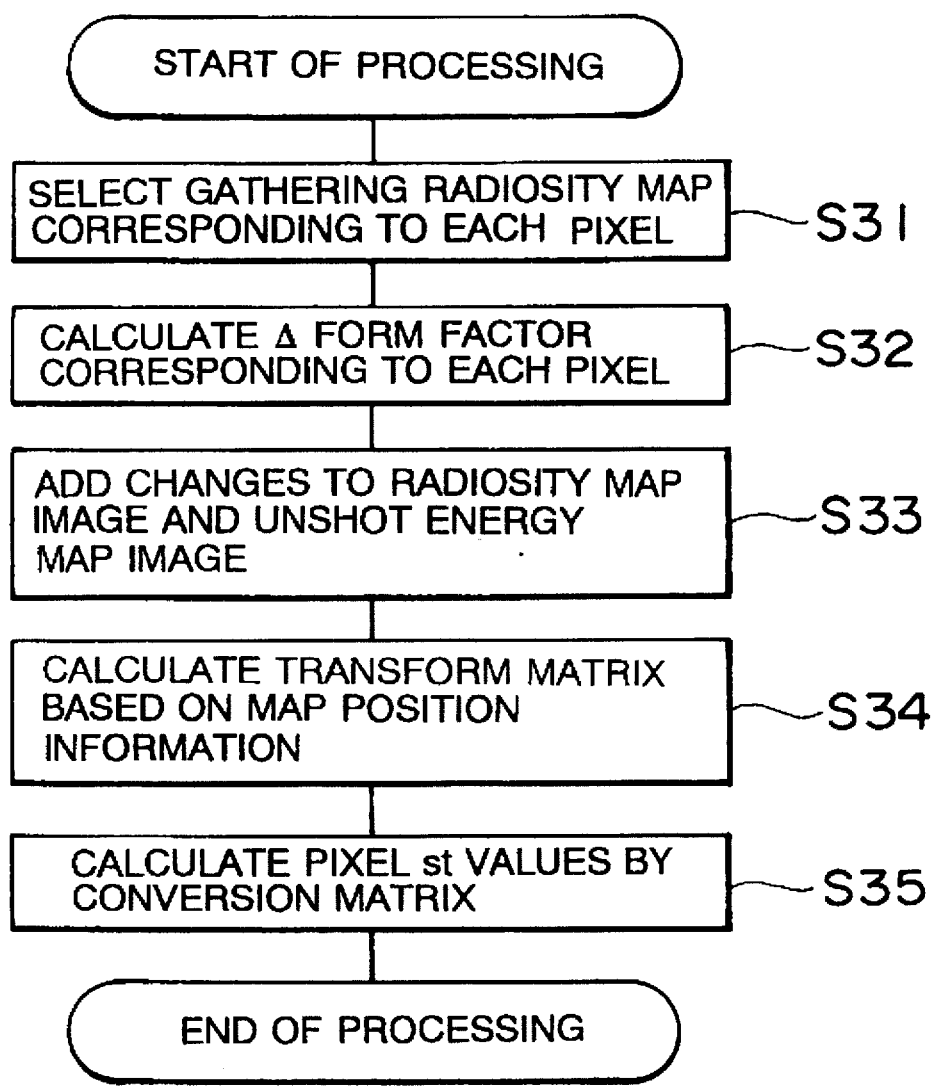
FIG. 15 is a flowchart for explaining the operation of the system in FIG. 14.

The operation of the drawing system having the structure as shown in FIG. 14 will now be described with reference to FIG. 15. Because the other portion of the structure in FIG. 14 than the map updating section 4A is the same as is shown in FIGS. 3-6, FIG. 15 mainly illustrates the processing associated with the map updating performed by the map updating section 4A.

Based on the pixel Z value or pixel ID value of each pixel stored in the ID buffer 3, the gathering map selector 41 selects the gathering radiosity map 12 corresponding to that pixel (step S31).

The form-factor calculator 42 computes the Δ form factor corresponding to each pixel in the ID buffer 3 based on the pixel coordinate values and the gathering radiosity map selected by the gathering map selector 41 (step S32).

The radiosity-change calculator 43 multiplies the unshot energy on the light-shooting surface by the Δ form factor, calculated by the form-factor calculator 42 to compute Δ radiosity. The radiosity-change calculator 43 also multiplies the Δ radiosity by the area ratio of the surface to obtain Δ unshot energy. The radiosity-change calculator 43 adds the Δ radiosity to the radiosity map image of the gathering map selector 12 and adds the Δ unshot energy to the unshot energy map image of the gathering map selector (step S33).

Next, the transform-matrix calculator 44 calculates a transform matrix for converting the pixel coordinate values in the ID buffer 3 to the pixel st values in the gathering map 12 based on the shooting positional information stored in the shooting radiosity map 11 and the gathering map positional information in the gathering radiosity map 12 (step S34).

The transform matrix has a 3×3 size, for example. The transform-matrix calculator 44 multiplies a 4×4 matrix tcToWc for converting the pixel st values in the gathering radiosity map 12 to the coordinate values on the world coordinate system by a 4×4 matrix wcToDc computed by the transform-matrix calculator 22, thereby obtaining a 3×3 excess factor matrix tcToDc from which the (3, 3) element, i.e., the element corresponding to the Z component has been removed. The transform-matrix calculator 44 then calculates an inverse matrix dcTotc of this excess factor matrix tcToDc.

The pixel st-value calculator 45 performs coordinate transformation on the pixel coordinate values (x, y) by the transform matrix to compute the pixel st values (step S35).

According to the drawing system having the structure as illustrated in FIG. 14, the pixel st values can be computed from the pixel coordinate values without being temporarily stored in the ID buffer 3, thus making it possible to reduce the memory capacity of the ID buffer 3.

Fourth Embodiment

Figure 16:
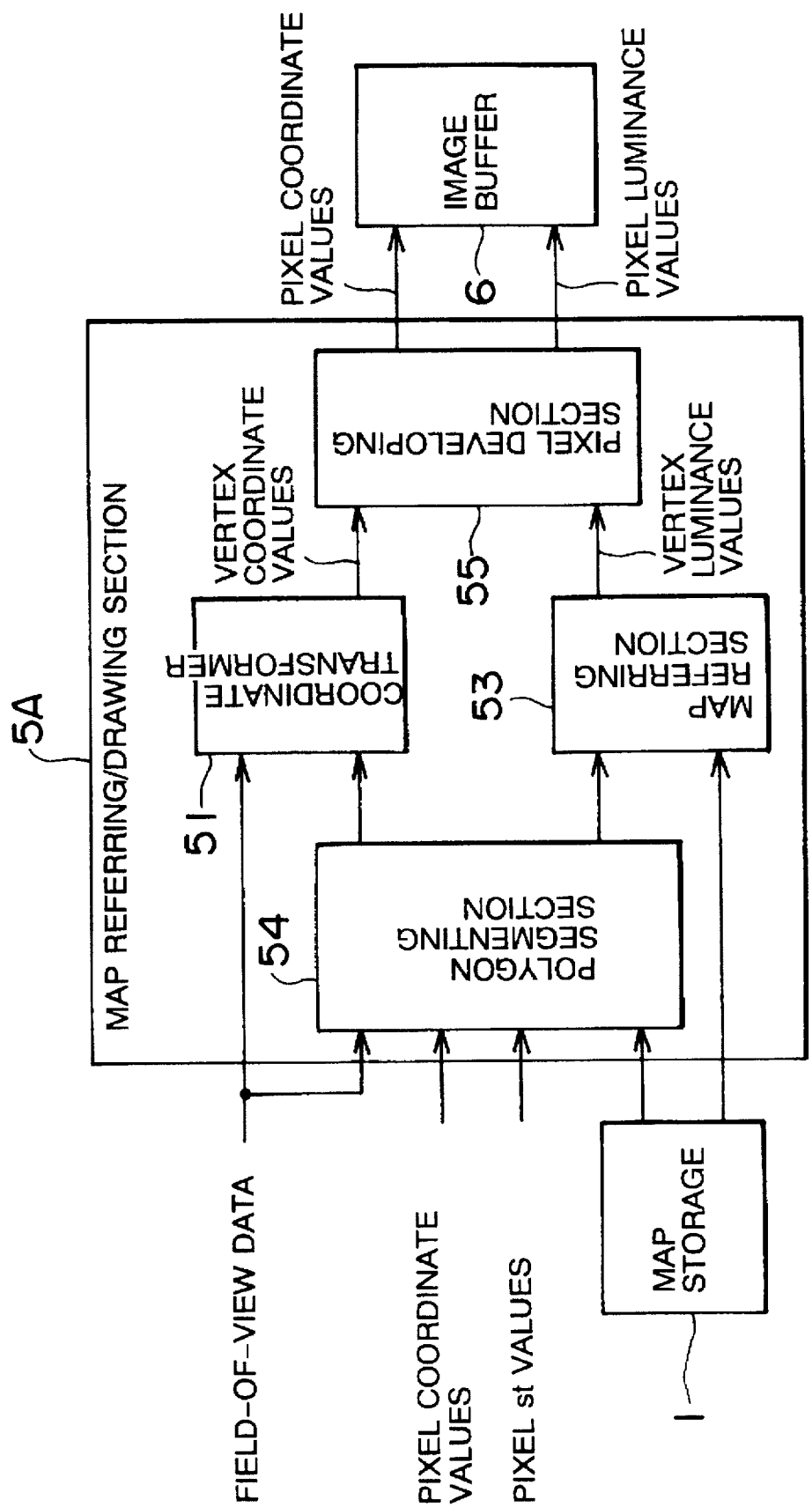
FIG. 16 is a block diagram showing the structure of the essential portions of a drawing system according to a fourth embodiment of this invention.

FIG. 16 shows the structures of the essential portions of a drawing system according to the fourth embodiment of this invention. The feature of this drawing system lies in its map referring/drawing section 5A having a different structure from that of the map referring/drawing section 5 shown in FIG. 3.

The map referring/drawing section 5A in FIG. 16 has a coordinate transformer 51, a map referring section 53, a polygon segmenting section 54 and a pixel developing section 55.

As the coordinate transformer 51 and map referring section 53 are basically the same as those shown in FIG. 6, same reference as used in FIG. 6 will also be given to those components in FIG. 16 and their detailed descriptions will be omitted.

The polygon segmenting section 54 segments a polygon based on field-of-view data, the vertex coordinate values of the polygon, the vertex st values of the polygon and the resolution of the associated radiosity map stored in the map storage 1, and acquires the vertex coordinate values and vertex st values of the segments. The polygon segmenting section 54 supplies the vertex coordinate values to the coordinate transformer 51 and the vertex st values to the map referring section 53.

The pixel developing section 55 develops each polygon to pixels based on the vertex coordinate values transformed by the coordinate transformer 51, obtains the pixel luminance values of the individual pixels and outputs the pixel luminance values to the image buffer 6 in association with the pixel coordinate values. That is, the pixel developing section 55, which is substantially the same as the pixel developing section 52 shown in FIG. 6, outputs the luminance values of the pixels whereas the pixel developing section 52 outputs the pixel st values.

Figure 17:
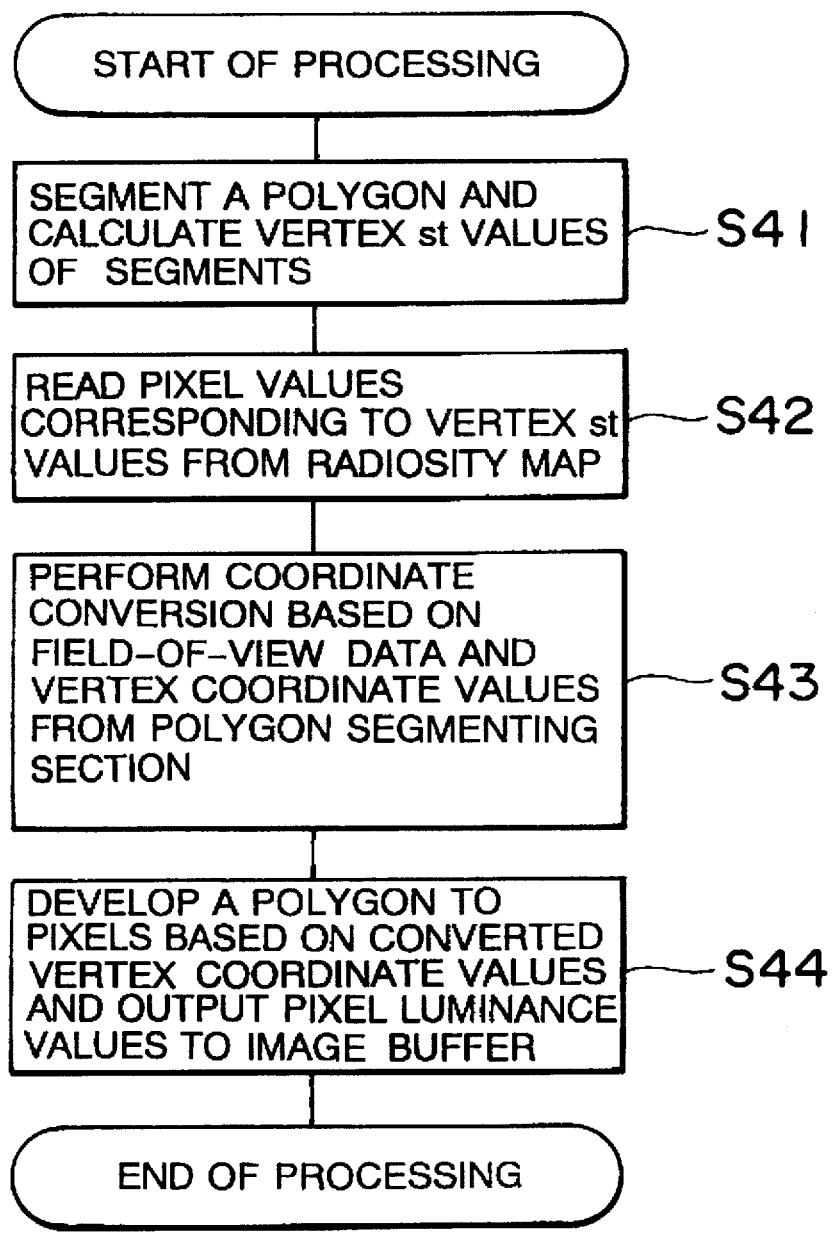
FIG. 17 is a flowchart for explaining the operation of the system in FIG. 16.

The operation of the drawing system having the structure as shown in FIG. 16 will now be described with reference to FIG. 17. Because the other portion of the structure in FIG. 16 than the map referring/drawing section 5A is the same as is shown in FIGS. 3-6, FIG. 17 mainly illustrates the processing associated with the drawing performed by the map referring/drawing section 5A.

The polygon segmenting section 54 segments a polygon in such a way that every segmented polygon has a size of about one pixel in the radiosity map (step S41). When this size is considerably smaller than the size of one pixel on the image buffer 6, the segments are too small. In this case, the segment size should be increased or the number of segments should be reduced to provide the proper size of segments.

The segmentation of the surface is performed in accordance with the resolution of the radiosity map. For example, when the surface is not segmented at all, i.e., when the whole surface has one radiosity, the resolution of the radiosity map is 1×1. When the surface is divided by 16, the resolution of the radiosity map is 4×4. The resolution of the radiosity map defines the precision of the computation of the radiosity of that surface, and the quality is improved as the resolution becomes higher.

The polygon segmenting section 54 outputs the vertex coordinate values to the coordinate transformer 51 and the vertex st values to the map referring section 53.

The map referring section 53 reads pixel values corresponding to the vertex st values from the associated radiosity map and outputs the pixel values as vertex luminance values to the pixel developing section 55 (step S42). The coordinate transformer 51 performs coordinate transformation on the vertex coordinate values from the polygon segmenting section 54 based on the field-of-view data (step S43).

The pixel developing section 55 develops each polygon to pixels based on the vertex coordinate values obtained by the coordinate transformer 51, and outputs pixel luminance values of the individual pixels from the map referring section 53 to the image buffer 6 in association with the pixel coordinate values (step S44).

As described above, the drawing system structured as shown in FIG. 16 determines the precision of the computation of the radiosity on a surface by the segmentation of a polygon, so that the precision of the radiosity computation can be improved by increasing the resolution of the radiosity map.

Fifth Embodiment

Figure 18:
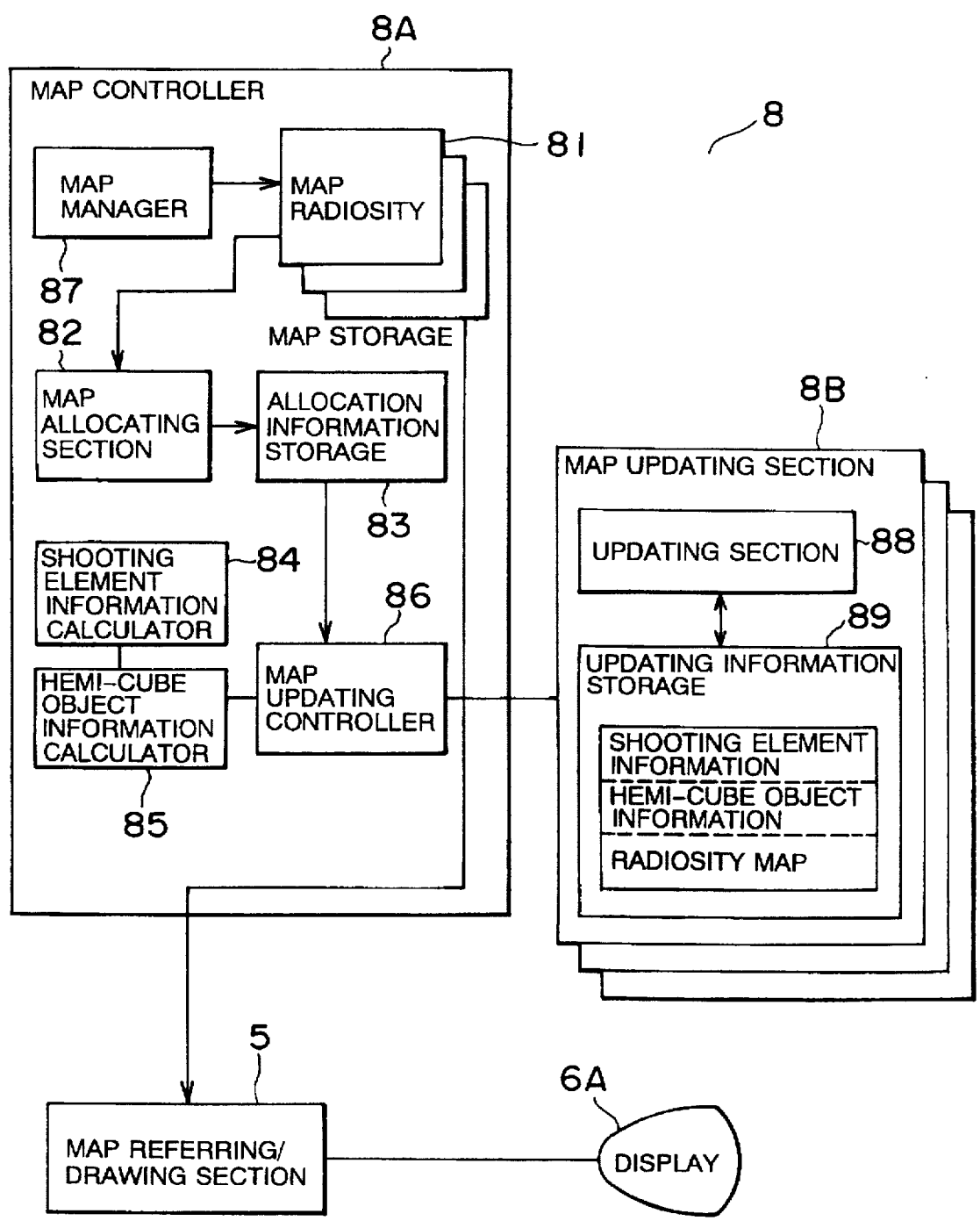
FIG. 18 is a block diagram showing the structure of the essential portions of a drawing system according to a fifth embodiment of this invention.

FIG. 18 shows the structures of the essential portions of a drawing system according to the fifth embodiment of this invention. The feature of this drawing system lies in that a map processor 8 is provided in place of the map storage 1 and map updating section 4 shown in FIG. 3 or the map storage 1 and the map updating section 4A shown in FIG. 14. This map processor 8 has a map controller 8A and a plurality of map updating sections 8B.

The map controller 8A has a map storage 81, a map allocating section 82, an allocation information storage 83, a shooting element information calculator 84, a hemi-cube information calculator 85, a map updating controller 86 and a map manager 87. Each of the map updating sections 8B has an updating information storage 89. The number of the map updating sections 8B, which have the same structure and are arranged in parallel to each other, is not limited. But, the greater the number of the map updating sections 8B is, the greater the effect of the parallel processing becomes, thus contributing to shortening the processing time.

To begin with, the structure of the map controller 8A will be discussed. The map storage 81, like the map storage 1 in FIG. 3, stores a plurality of radiosity maps. The map allocating section 82 allocates radiosity maps in the map storage 81 to be updated to the respective map updating sections 8B in accordance with the map allocating elements, such as the pixel ID's or pixel Z values, given from the ID buffer 3, prepares allocation information of the radiosity maps and stores the allocation information in the allocation information storage 83.

The shooting element information calculator 84 obtains a light-shooting element (hereinafter simply called "shooting element") information such as the energy, position and direction of a shooting element corresponding to the shooting radiosity map or a light-shooting polygon. The hemi-cube information calculator 85 computes a transform matrix for a hemi-cube around the shooting element based on the position and direction of the shooting element included in the shooting element information obtained by the shooting element information calculator 84, and stores the map ID of the radiosity map associated with those information in the ID buffer (not shown in FIG. 18). The map updating controller 86 stores the shooting element information, obtained by the shooting element information calculator 84, and the hemi-cube information, obtained by the hemi-cube information calculator 85, in the updating information storages 89 in all the map updating sections 8B. Further, the map updating controller 86 refers to the allocation information of the radiosity maps in the map allocation information storage 83 and stores the associated radiosity maps in the updating information storages 89 of the respective map updating sections 8B. When the necessary information is stored in the updating information storages 89, the map updating controller 86 sequentially instructs the map updating sections 8B to execute the updating process.

The map manager 87 prepares radiosity maps to be stored in the map storage 81 or erases radiosity maps therefrom to manage the defined radiosity maps.

The structure of each map updating section 8B will now be described. An updating processor 88 performs the updating process by referring to the updating information of the radiosity maps to be stored in the updating information storage 89, thereby updating the associated radiosity map.

The map controller 8A serves as an application interface and has the functions of preparing/erasing radiosity maps, allocating radiosity maps and updating radiosity maps.

The map referring/drawing section 5 obtains the radiosity values by referring to the radiosity maps to be stored in the map storage 81, draws an image based on the radiosity values and displays the image on a display 6A. The display 6A may be the image buffer shown in, for example, FIG. 3.

The map updating sections 8B are designed independent of the map controller 8A. In response to an execution instruction from the map controller 8A, each map updating section 8B updates the associated radiosity map by referring to the shooting element information in the radiosity map, hemi-cube information and updating information of the radiosity map and the like, stored in its updating information storage 89. The map controller 8A instructs each map updating section 8B to write or read updating information in or from the updating information storage 89 and to execute the updating of the associated radiosity map.

Figure 19:
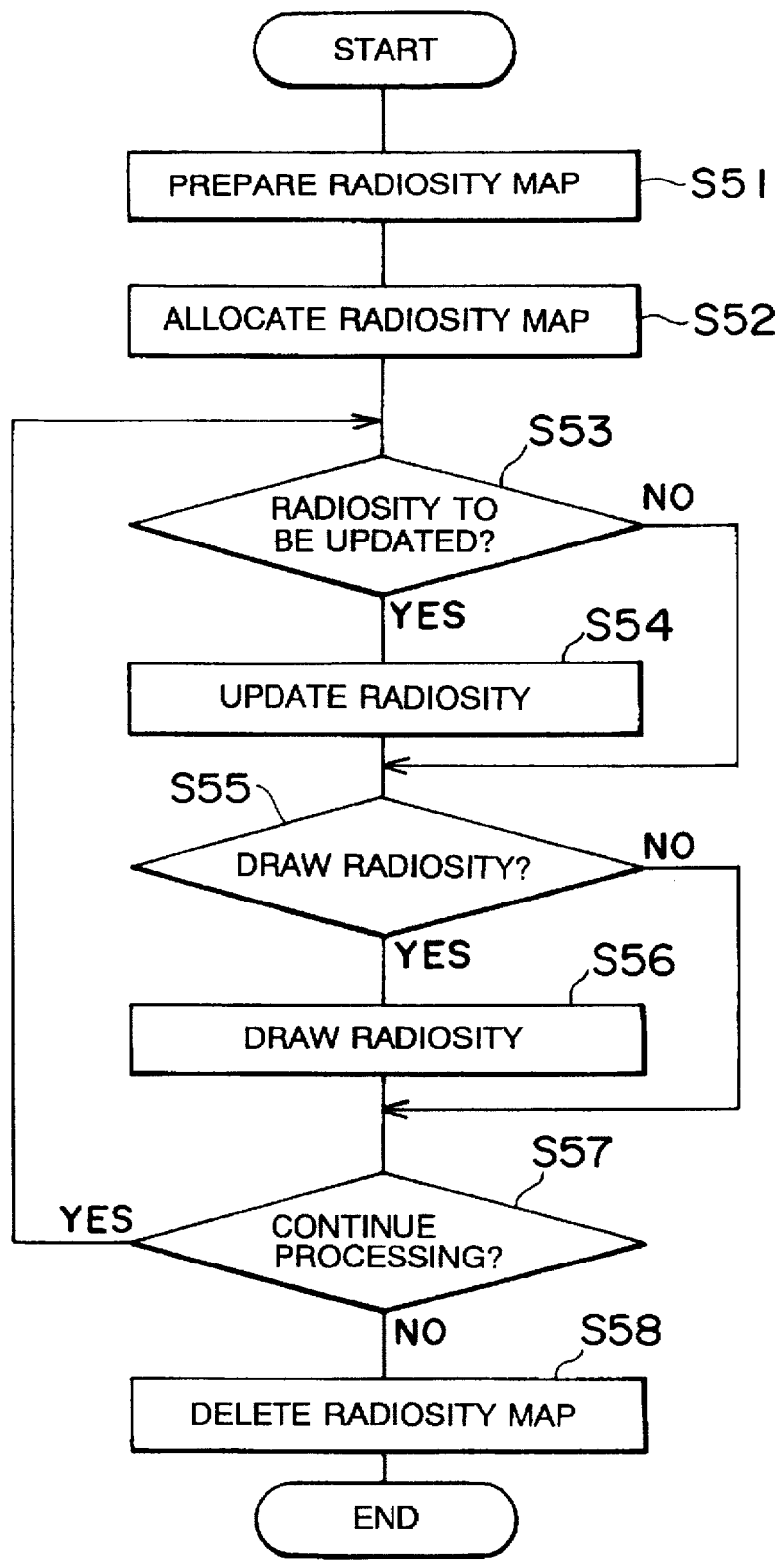
FIG. 19 is a flowchart for explaining the operation of the system in FIG. 18.

FIG. 19 illustrates a sequence of the drawing process according to the radiosity algorithm in the drawing system shown in FIG. 18 as viewed from the application interface.

An application interface prepares the desired number of radiosity maps, and defines figures or surfaces to the radiosity maps (step S51). Next, the map allocating section 82 allocates each radiosity map, prepared in step S51, to the associated one of the map updating sections 8B (step S52).

Next, the surface to be a shooting element or the shooting radiosity map is selected and it is checked if the radiosity should be updated (step S53). When updating is necessary, the radiosity of that radiosity map is updated (step S54). This updating of the radiosity is repeated as needed while changing the shooting elements (shooting radiosity maps).

It is then checked if the radiosity drawing should be performed (step S55). When the radiosity drawing is necessary, this drawing is carried out (step S56). The radiosity drawing is normally performed when the radiosity converges through the repeated updating of the radiosity by a predetermined number of times. It is however possible to draw the intermediate results during the radiosity converging process, when needed. When no radiosity drawing is necessary in step S55 or the process associated with the radiosity is completed in step S56, it is checked if the processing should continue (step S57). When there remains any unprocessed radiosity map and the processing should continue, the shooting radiosity map is changed and the flow returns to step S53. When the processing is completed for every radiosity map and it is determined in step S57 that the processing need not continue, the radiosity maps in the map storage 81 are erased to terminate the processing.

Figure 20:
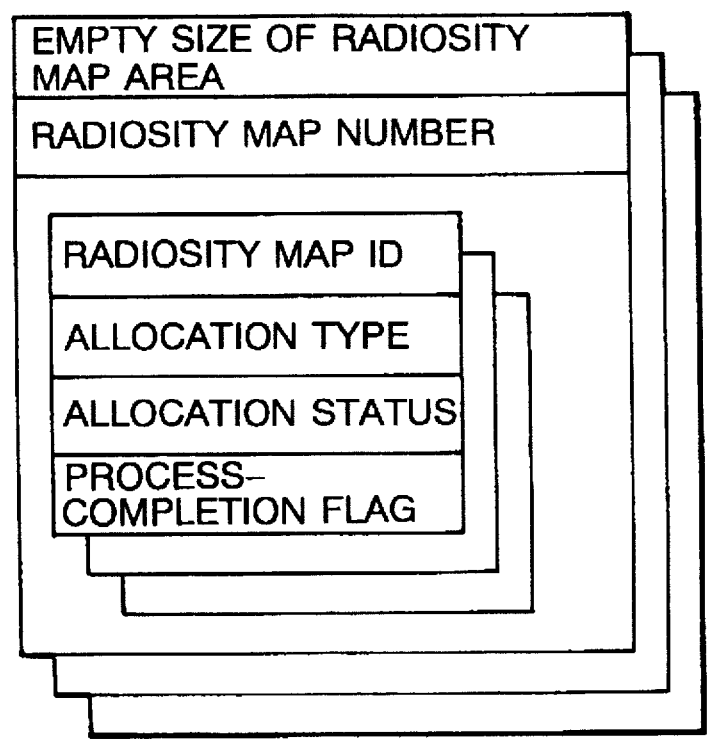
FIG. 20 is an exemplary diagram for explaining the content of radiosity-map allocating information in the system in FIG. 18.

FIG. 20 shows the structure of the map allocation information of a radiosity map to be stored in the allocation information storage 83.

The map allocation information has entries equal in number to the map updating sections 8B. Each entry includes the empty size of the radiosity map area, the number of the allocated radiosity maps, the radiosity map ID's for the allocated radiosity maps, the allocation type, the allocation status, and a flag indicating the completion of the process.

The processing by the map allocating section 82 is performed as follows.

(1) When the processing starts, radiosity maps are sorted in the order of greater sizes. This sorting is performed to make it easier to set the uniform size for the radiosity map allocated to the map updating sections.

(2) The map allocation information is initialized. This initialization associates the entire size of the map area with the empty size in the map area and sets the number of radiosity maps to zero.

(3) This processing is terminated after performing the following sequence of processes for each radiosity map in accordance with the sorted order.

(3-1) The map updating section which has the largest empty size in the radiosity map area in the map updating information is searched.

(3-2) It is checked if the size of the radiosity map is equal to or smaller than the empty size in the radiosity map area.

(3-2-1) When the size of the radiosity map is equal to or smaller than the empty size in the radiosity map area, the radiosity map is allocated as a stay-resident type to the associated map updating section 8B.

At this time, the empty size in the radiosity map area decreases the size of the allocated radiosity map, the number of the radiosity maps is incremented, the map ID is changed to the map ID of the allocated radiosity map, the allocation type is set as the stay-resident type and the allocation status is set to the non-stay-resident state.

(3-2-2) When the size of the radiosity map is larger than (is not equal to and not smaller than) the empty size in the radiosity map area, the radiosity map is allocated as a non-stay-resident type to the associated map updating section 8B.

At this time, the empty size in the radiosity map area decreases the size of the allocated radiosity map, the number of the radiosity maps is incremented, the map ID is changed to the map ID of the allocated radiosity map, the allocation type is set as the non-stay-resident type and the allocation status is set to the non-stay-resident state.

The processing by the map updating controller 86 is executed as follows.

(1) When the processing is initiated, first, the shooting element information and hemi-cube information are written in all the map updating sections 8B.

(2) The process-completion flags in the allocation information of the radiosity maps are all set to zero.

(3) The number, n, of the map updating sections 8B to be processed is initialized. More specifically, the number of the map updating sections 8B is set to the number n of the map updating sections 8B to be processed.

(4) The following sequence of processes is performed for each map updating section 8B. That is, the process sequence is repeated until the number n of the map updating sections 8B to be processed becomes zero while sequentially changing the map updating section 8B to be processed.

(4-1) It is checked if there is an unprocessed radiosity map in the map updating section 8B, i.e., it is checked if there is any radiosity map whose process-completion flag is "0."

(4-1-1) When an unprocessed radiosity map exists in the map updating section 8B or there is any radiosity map whose process-completion flag is "0," it is checked if the map updating section 8B is undergoing the updating of the radiosity.

(4-1-1-1) When the map updating section 8B is not undergoing the updating of the radiosity, it is then checked if the allocation type of the radiosity map is a stay-resident type.

(4-1-1-1-1) When the allocation type of the radiosity map is a stay-resident type, it is then checked if the allocation status of the radiosity map is the non-stay-resident state.

(4-1-1-1-1-1) When the allocation status of the radiosity map is the non-stay-resident state, the radiosity map is written in the map updating section 8B.

(4-1-1-1-1-2) The allocation status of the radiosity map is changed to the stay-resident state.

(4-1-1-1-2) When the allocation status of the radiosity map is the stay-resident state, the map updating section 8B is allowed to start updating the radiosity map.

(4-1-1-1-2-1) When the allocation type of the radiosity map is a non-stay-resident type, the last radiosity map allocated to the map updating section 8B is written back to the map storage 81 in the map controller 8A, and the allocation status is changed to the non-stay-resident.

(4-1-1-1-2-2) The radiosity map to be processed is written in the empty area in the map updating section 8B.

(4-1-1-1-2-3) The map updating section 8B is allowed to start updating the radiosity map.

(4-1-1-1-2-4) The map updating controller 86 waits for the completion of the processing by the map updating section 8B.

(4-1-1-1-2-5) The processed radiosity map is written back in the map storage 81 in the map controller 8A.

(4-1-1-2) The process-completion flag in the radiosity map allocation information is set to "1."

(4-1-2) When there is no unprocessed radiosity map in the map updating section 8B or there is no radiosity map whose process-completion flag is "0," the number n of the map updating sections 8B to be processed is decremented by "1" and then the processing goes for the next map updating section 8B.

(5) This processing is terminated when the processing of all the map updating sections 8B is completed.

As apparent from the above, the drawing system in FIG. 18 has the following features.

The radiosity map once stored in the map updating section 8B stays there while it is unnecessary for the map controller 8A to refer to that radiosity map. When the map controller 8A should refer to the radiosity map as in the case of the radiosity drawing, the process of writing the radiosity map back into the map controller 8A from the map updating section 8B is performed. While the updating of the radiosity is repeated, the radiosity map in the map updating section 8B is updated, thereby shortening the time for storing the radiosity map and writing the radiosity map back into the map controller 8A in every updating of the radiosity.

When the number of radiosity maps is greater than the number of the map updating sections, a plurality of radiosity maps are allocated to one map updating section 8B as much as permitted by the capacity of the updating information storage 89 thereof. In this case, the map updating section 8B executes the updating process for each radiosity map in the radiosity updating process.

In the case where a plurality of radiosity maps are allocated to one map updating section 8B, when no empty area becomes available in the updating information storages 89 of all the map updating sections 8B and some radiosity maps cannot be allocated, those radiosity maps are set to the "non-stay-resident type." When a "non-stay-resident type" radiosity map is to be updated in the radiosity updating process, one radiosity map is written back into the map controller 8A with respect to the map updating section which has completed the processing of all the allocated radiosity maps, providing an empty area, and the "non-stay-resident type" radiosity map is stored in the empty area.

In allocating a plurality of radiosity maps in a single map updating section 8B, the allocation is executed in such a manner that the total of the sizes of the radiosity maps allocated to each map updating section 8B (i.e., the products of the vertical and horizontal resolutions of the radiosity maps) becomes even. The processing time of the map updating section 8B tends to increase in proportion to the size of the radiosity map. By making the total of the sizes of the radiosity maps allocated to each map updating section 8B even, the processing time required to update all the radiosity maps can be minimized.

Sixth Embodiment

Figure 21:
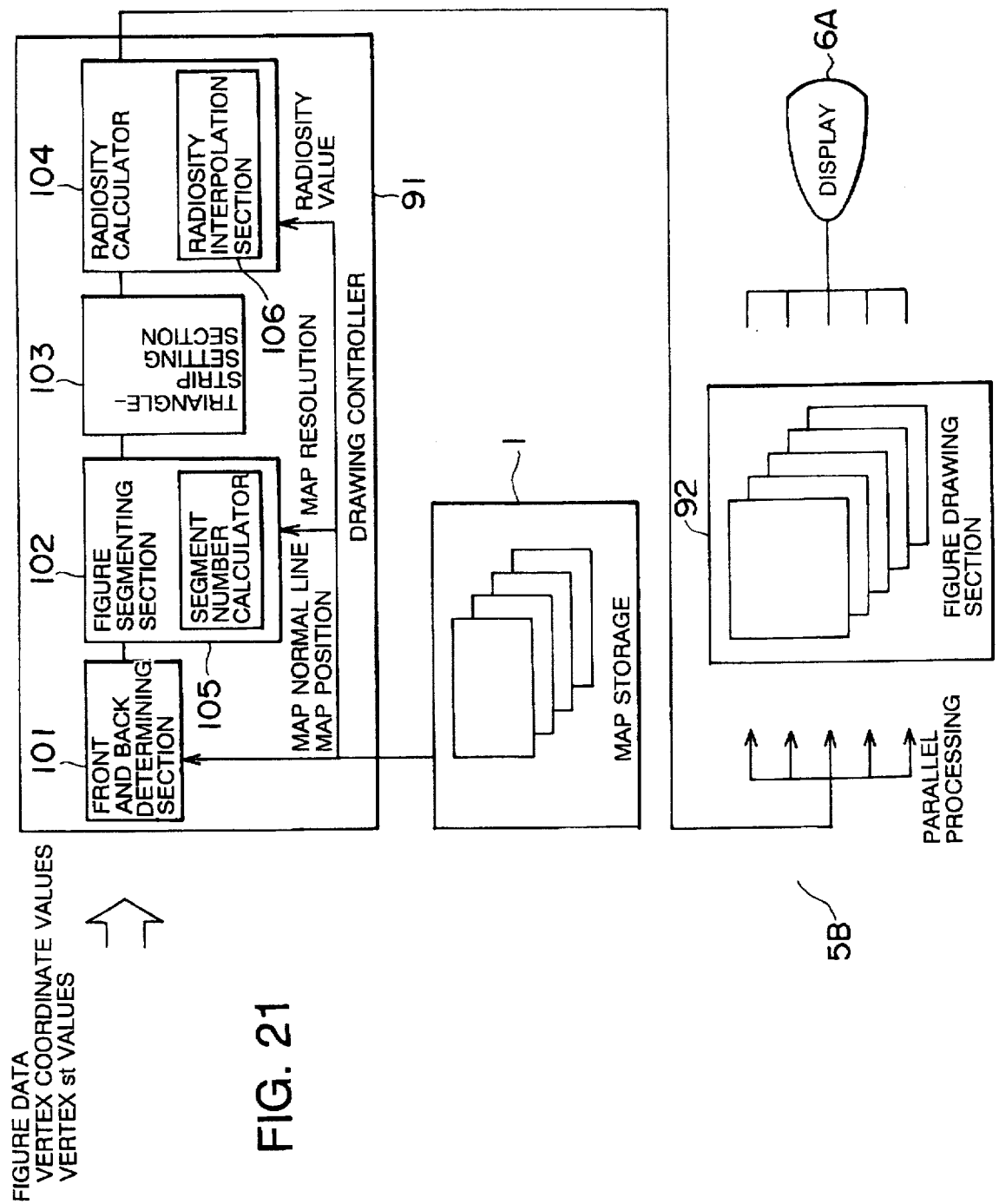
FIG. 21 is a block diagram showing the structure of the essential portions of a drawing system according to a sixth embodiment of this invention.

FIG. 21 shows the structures of the essential portions of a drawing system according to the sixth embodiment of this invention. The feature of this drawing system lies in that a map referring/drawing section 5B is provided in place of the map referring/drawing section 5A shown in FIG. 16. This map referring/drawing section 5B has a drawing controller 91 and a plurality of figure drawing sections 92.

The drawing controller 91 includes a front and back determining section 101, a figure segmenting section 102, a triangle-strip setting section 103 and a radiosity calculator 104. Further, the figure segmenting section 102 has a segment number calculator 105, and the radiosity calculator 104 has a radiosity interpolation section 106.

The drawing controller 91 is supplied with the vertex coordinate values and vertex st values as figure data. The drawing controller 91 refers to the contents of the map storage 1 to obtain information including the map normal line indicative of the direction of a map, the position of the map, the resolution of the map and the radiosity.

The display 6A, like the one shown in FIG. 18, may be equipped with the image buffer.

First, the drawing controller 91 will be described.

The front and back determining section 101 determines whether a radiosity map is for the front or back of a surface to discriminate whether or not the radiosity map is visible at the currently set view point. Through this determination, the front and back determining section 101 determines if the radiosity map can be seen from the current view point. For the front and back of each surface, a front radiosity map and a back radiosity map or a radiosity map for the front side and a radiosity map for the back side are formed. The front and back determining section 101 therefore determines whether the radiosity map of interest is for the front side which is visible from the view point or the back side which is not visible from the view point (which need not be processed).

The figure segmenting section 102 divides the figure data, which has been determined as visible by the front and back determining section 101, by the resolution of the radiosity map set then. The segment number is computed by the segment number calculator based on the resolution of the radiosity map. The segment number calculator 105 obtains the segment number in such a manner that the figure substantially becomes the map resolution on the radiosity map.

The triangle-strip setting section 103 forms triangle strips for the segmented figures. The radiosity calculator 104 calculates the radiosity for each vertex of each triangle strip formed by the triangle-strip setting section 103. The radiosity values corresponding to the vertices of the figure are set on the radiosity map and are computed from the vertex coordinates of each figure. While the divided vertices may not take integer values, the radiosity values are set as integer values in the radiosity map. When the vertices of a figure do not take integer values, the radiosity values should be computed from the closest point in the radiosity map. In this manner, the accurate radiosity values cannot be obtained. In this respect, the radiosity interpolation section 106 performs interpolation of the radiosity values.

The figure drawing sections 92 allocate the radiosity values to the vertices of the segmented figures and perform radiosity drawing on the figures by the Gouraud shading.

The figure drawing sections 92 perform parallel drawing processing of the figure data sent from the drawing controller 91 for each segmented triangle-strip data to execute fast radiosity drawing.

Figure 22:
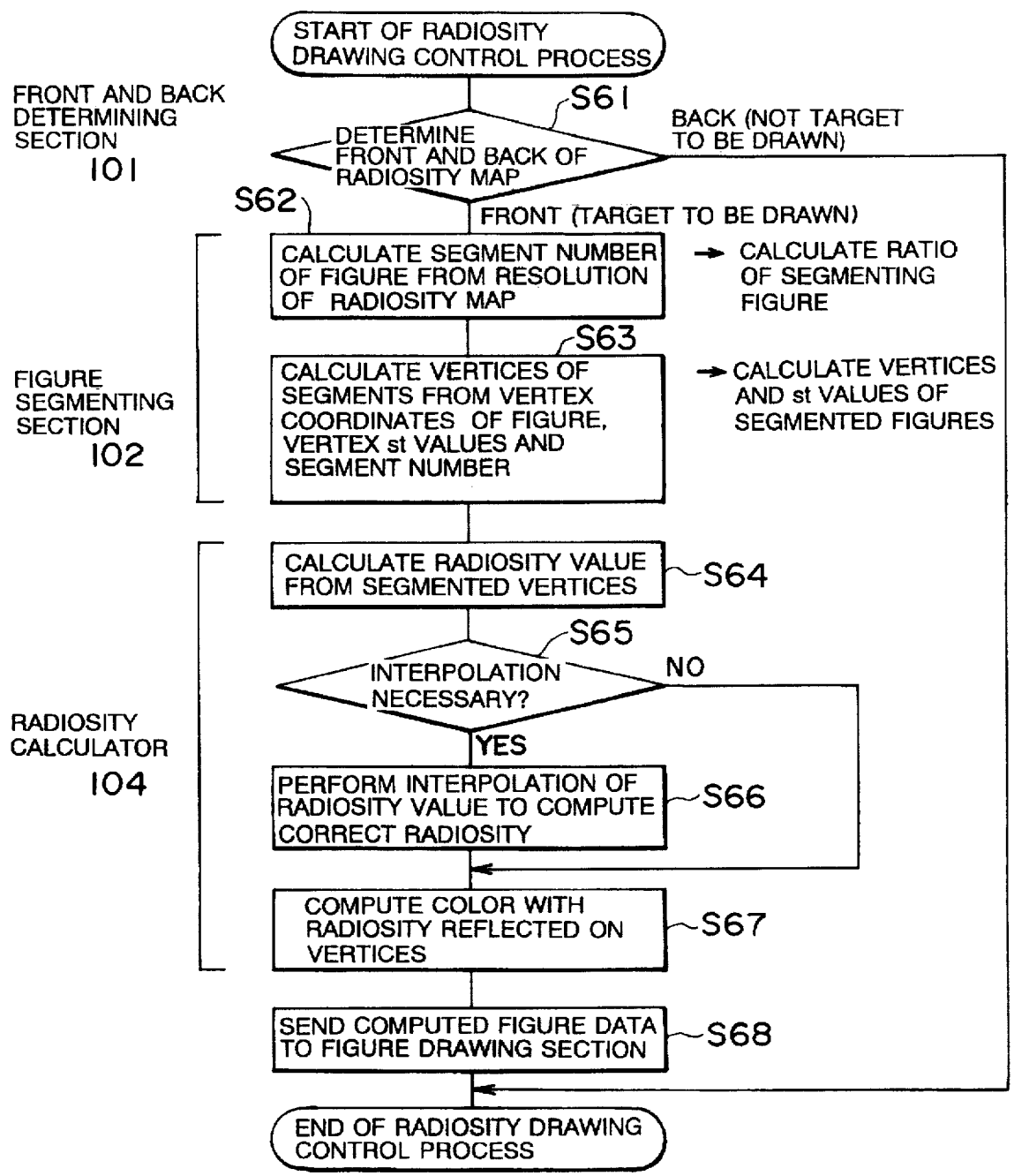
FIG. 22 is a flowchart for explaining the operation of the system in FIG. 21.

The operation of the drawing system having the structure shown in FIG. 21 will be discussed with reference to FIG. 22.

The front and back determining section 101 determines whether or not the radiosity map corresponding to the figure data to be processed by the drawing controller 91 is the target for the radiosity drawing (step S61). In this process, the normal vector of the radiosity map set on the world coordinate system WC is transformed on the coordinates on the normalized projection coordinate system NPC. The coordinates are compared with the currently set view point to determine if the figure data is visible. This determination can eliminate the unnecessary radiosity processing. When it is found that the radiosity map should not be visible, the processing is terminated (no radiosity drawing is performed). When the radiosity map should be visible, on the other hand, the next processing is performed.

The figure segmenting section 102 divides the figure data by the set resolution of the radiosity map based on the number of segments obtained by the segment number calculator 105 (steps S62 and S63).

Figures 23, 24:
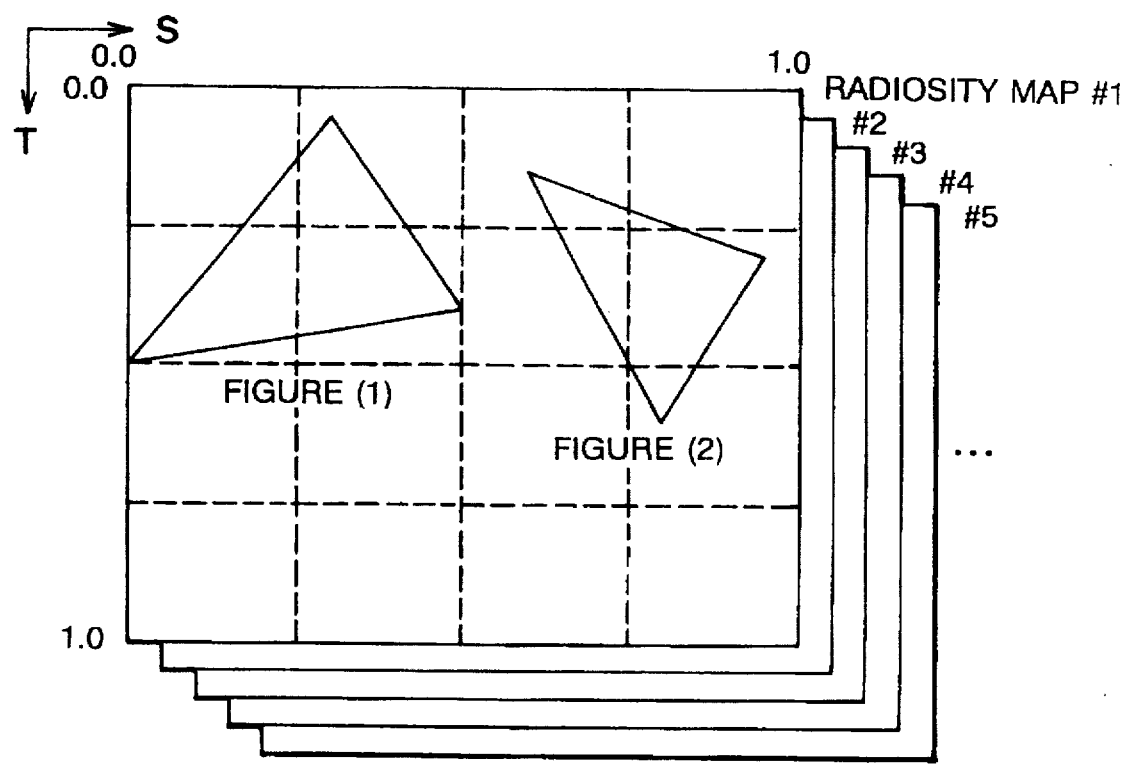
FIG. 23 is an exemplary diagram for explaining the content of vertex data for the segmentation of a figure in the system in FIG. 21.
FIG. 24 is an exemplary diagram for explaining radiosity maps in the system in FIG. 21.

The vertex data for each vertex of a figure to be segmented has the data format as shown in FIG. 23. More specifically, the vertex data of a figure has the vertex coordinates of the figure, the color of the figure at the time of drawing and the st values in the radiosity map corresponding to the vertex of the figure. The radiosity map is structured as two-dimensional image data to have a size according to the resolution of the radiosity map. The radiosity values associated with the figure are set to the individual pixels of the radiosity map. The vertex st values, which correspond to the positions of the pixels on the radiosity map, are set for the individual vertices in the figure data. As shown in FIG. 24, the st values on the radiosity map are expressed by 0.0 to 1.0 for the S and T coordinates. A plurality of figures may be allocated to a single radiosity map as shown in FIG. 24.

With reference to FIGS. 25A to 25D, the method of segmenting a figure will be described specifically. The segment number calculator 105 obtains the segment number in such a way that the figure of interest substantially becomes the map resolution on the radiosity map (step S62). That is, the segment number for the figure is obtained based on the resolution of the radiosity map and the st values on the radiosity map corresponding to the vertices of the figure. The reciprocal of this segment number is the segmentation ratio of the figure, which is used in the computation to divide between vertices.

Figure 25A:
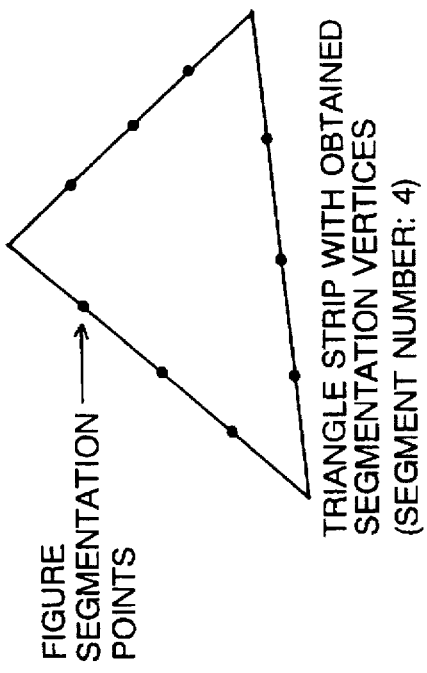
FIGS. 25A through 25D are exemplary diagrams for explaining the segmentation of a figure in the system in FIG. 21.
Figure 25B:
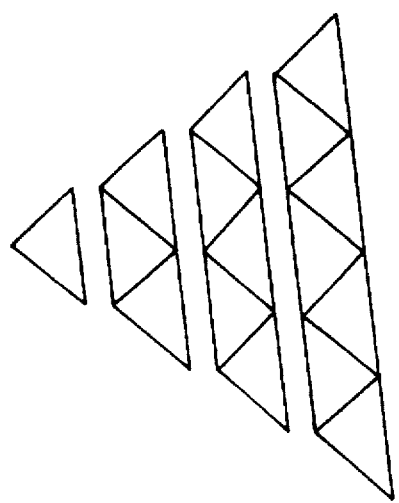
Figure 25C:
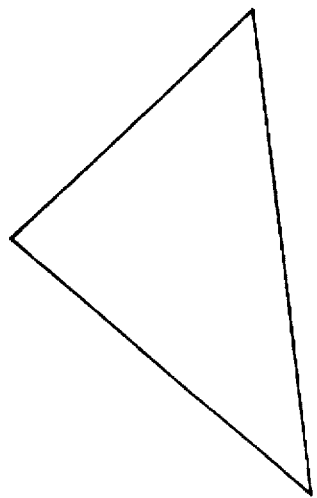
Figure 25D:
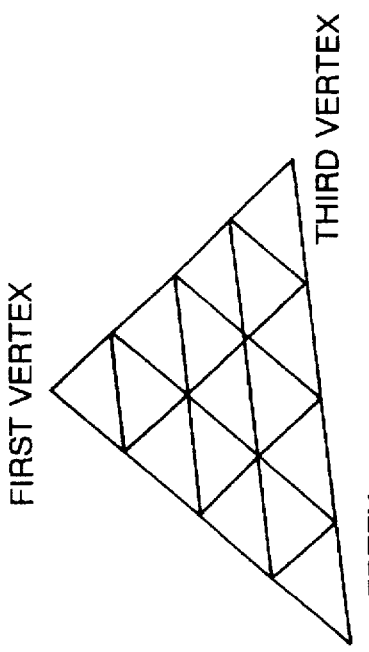

Next, when the figure is a triangle (FIG. 25A), for example, each of the edges between the first and second vertices of the figure, between the first and third vertices and between the second and third vertices is multiplied by the obtained segmentation ratio to acquire the segmentation vertices on each edge between vertices (FIG. 25B) (step S63). The original figure data is segmented using those segmentation vertices (FIG. 25C) to form triangle strips (FIG. 25D). This setting of the triangle strips by segmentation is performed by the triangle-strip setting section 103.

The radiosity calculator 104 calculates the radiosity for each vertex of each segmented triangle strip (FIG. 26A). The radiosity value corresponding to each vertex of the figure has been set on the radiosity map and is obtained from the vertex coordinates x, y (step S64). While the reciprocal of each st value of the divided vertices may not become an integer, the radiosity values are set as integer values in the radiosity map. When the vertices of the figure do not take integer values, therefore, the radiosity values should be computed from the closest point in the radiosity map. Accordingly, the accurate radiosity values cannot be obtained, affecting the quality of the radiosity drawing. It is therefore determined if interpolation is needed (step S65), and if the interpolation is necessary, the radiosity value should be interpolated.

The interpolation of the radiosity is performed in the radiosity interpolation section 106 in the radiosity calculator 104. First, the values obtained by multiplying the st values of the vertices by the map resolution are set to integer values. The integer values indicate the radiosity values of the vertices of the figure on the radiosity map (FIG. 26B). At this time, when the vertex coordinates include a decimal number, the interpolation of the radiosity should be performed by the radiosity interpolation section 106. When there is a decimal value in the X direction, interpolation between the radiosity value obtained from the associated integer value and the next radiosity value with a decimal value is executed to obtain the accurate radiosity value in the X direction (FIGS. 26C and 26D). Further, if interpolation is performed between the obtained radiosity value in the X direction and the next radiosity value in the Y direction in the similar manner, the accurate radiosity value corresponding to the actual vertex can be computed (FIG. 26E) (step S66). When the st value of the vertex of the figure originally takes an integer value, interpolation by a decimal value is unnecessary.

The radiosity is reflected on the color of the figure by reflecting the accurate radiosity value of each vertex obtained by the interpolation on the associated vertex of the figure using the following equation 3 (step S67).

$R$ component of the color of the vertex of the figure = (3)

($R$ component of the radiosity value + $R$ component of ambient term) ×

$R$ component of the color of the vertex of the figure $G$ component of the color of the vertex of the figure =

($G$ component of the radiosity value + $G$ component of ambient term) ×

$G$ component of the color of the vertex of the figure $B$ component of the color of the vertex of the figure =

($B$ component of the radiosity value + $B$ component of ambient term) ×

$B$ component of the color of the vertex of the figure

In the radiosity drawing, the luminance of a surface is calculated from the shooting and reflection of light energy between surfaces to update the radiosity value, and this updating process is repeated to ensure the realistic drawing. At the initial stage of the radiosity updating, however, the value of the light energy is weak so that when the image is displayed at this stage, the luminance is low, resulting in a dark image. To compensate for the low luminance, the ambient term is used for the approximation of the ambient light and the reflection thereof on the displayed image. As the radiosity updating is repeated, the light energy is kept reflected on the surface so that the ambient term is gradually reduced as the radiosity updating is repeated.

The radiosity drawing can be executed by allocating the radiosity values to the vertices of the segmented figures and drawing the figures through the Gouraud shading.

To perform the radiosity drawing, the drawing controller 91 sends the figure data to the multiple figure drawing sections 92 (step S68). The parallel drawing processing can be executed by sending the figure data to the individual figure drawing sections 92 for each segmented triangle-strip data, thus ensuring fast radiosity drawing.

The figure drawing sections 92 preform the radiosity drawing in parallel, and supply the drawing results to the display 6A to display them thereon.

As described above, in performing the radiosity drawing based on the radiosity maps, the drawing system in FIG. 16 can perform the parallel drawing process on a plurality of segmented figures, thus shortening the processing time and contributing to the performance of the radiosity drawing.

It is apparent that, in this invention, a wide range of different working modes can be formed based on the invention without deviating from the spirit and scope of the invention.

What is claimed is:

1. A drawing method of obtaining a converged value of a radiosity indicative of an intensity of light energy on each surface of a plurality of surfaces of a three dimensional graphical representation to be displayed, by repeating an exchange of light energy among said plurality of surfaces for a predetermined number of times, and associating luminance to radiosity of said plurality of surfaces to form a radiosity image, said method comprising:

a positional-information setting step of segmenting each of said plurality of surfaces to a plurality of polygons and defining said each surface based on said segmented polygons, and setting information indicative of a position of one or more points on each of said polygons on a two-dimensional coordinate system in each surface as positional information of each polygon on said two-dimensional coordinate system;

a map processing step of performing a process to form a plurality of radiosity maps indicative of a correlation between said positional information of each polygon and a pixel value equivalent to said radiosity at said position with respect to said plurality of surfaces; and a map referring/drawing step of referring to said plurality of radiosity maps and reading said pixel value corresponding to each positional information from said radiosity map corresponding to said each surface: and drawing a radiosity image on a display using said pixel values.

2. The method according to claim 1, wherein said positional-information setting step sets, as said position information, map coordinate values in coordinates of one of said radiosity maps associated with each vertex of said each polygon on said two-dimensional coordinate system.

3. The method according to claim 1, wherein said positional-information setting step includes an identifier setting step of setting an identifier for each of said polygons of said each surface to identify said radiosity map to which said polygon is to refer; and said map referring/drawing step includes a map selecting step of selecting said radiosity map associated with said identifier set by said identifier setting step.

4. The method according to claim 1, wherein said positional-information setting step includes:

an area computing step of computing an area of each of said polygons;

a polygon sorting step of sorting said plurality of polygons in an order of area sizes using results of computation in said area computing step;

an identifier setting step of extracting said plurality of polygons one by one in an sorting order in said polygon sorting step and grouping two or more polygons having similar surface directions and positions for a same identifier;

a map-information computing step of computing a position, direction and size of said radiosity map based on information of a position and direction of a surface which refers to a same radiosity map and is grouped for said same identifier; and a map coordinate setting step of obtaining map coordinate values of vertices of each polygon based on said position, direction and size of said radiosity map computed in said map-information computing step.

5. The method according to claim 3, wherein said map processing step includes:

a map defining step of defining a plurality of radiosity maps including at least one shooting radiosity map and at least one gathering radiosity map;

a buffer-data producing step of producing identifier buffer data including map identifiers for individual pixels constituting an identifier buffer storing map identifiers for identifying said at least one gathering radiosity map for individual pixels of a two-dimensional screen with said at least one shooting radiosity map taken as a view point, based on vertex coordinate values and vertex map coordinate values of each of said polygons and identifiers of said radiosity maps to which said polygons are to refer;

an identifier-buffer forming step of storing a map identifier for each pixel produced in said buffer-data producing step to form said identifier buffer; and a map updating step of updating data of each of said at least one gathering radiosity map according to radiosity information of said at least one shooting radiosity map based on said map identifier for each pixel stored in said identifier buffer.

6. The method according to claim 5, wherein said buffer-data producing step includes:

a shooting radiosity map selecting step of selecting one of said at least one shooting radiosity map;

a transform-matrix computing step of setting a plurality of two-dimensional screens constituting a plurality of fields of view around a position of said one shooting radiosity map selected in said shooting radiosity map selecting step, and obtaining a plurality of transform matrices for conversion to said plurality of fields of view;

a coordinate transforming step of performing coordinate transformation to convert coordinate values of each vertex of each polygon using said transform matrix obtained in said transform-matrix computing step; and a pixel developing step of developing each polygon to pixels based on said map coordinate values of vertices of each polygon and said vertex coordinate values resulting from said coordinate transformation.

7. The method according to claim 5, wherein said map updating step includes:

a gathering map selecting step of reading each pixel identifier stored in said identifier buffer and selecting a gathering radiosity map corresponding to said pixel identifier;

a form-factor computing step of obtaining a form factor representing a ratio of radiosity reaching a surface corresponding to said gathering radiosity map from a surface corresponding to said shooting radiosity map in accordance with a position corresponding to said pixel identifier; and a radiosity-change computing step of multiplying said form factor, obtained in said form-factor computing step, by a pixel value stored in said shooting radiosity map to thereby obtain an amount of a change in radiosity in said gathering radiosity map corresponding to said pixel identifier.

8. The method according to claim 1, wherein said map processing step includes:

a map control step of selectively allocating a plurality of radiosity maps to a plurality of map updating sections and transferring said plurality of radiosity maps to said map updating sections; and a parallel updating step of updating said plurality of radiosity maps, allocated in said map control step, in parallel.

9. The method according to claim 8, wherein said map control step includes:

a stay-resident allocation step of causing said radiosity maps, allocated in said plurality of map updating sections, to stay resident; and a writing-back step of writing updating results back to said radiosity maps at a time of referring to said radiosity maps in said map referring/drawing step.

10. The method according to claim 1, wherein said map referring/drawing step includes:

a drawing control step of segmenting a figure corresponding to each of said plurality of surfaces to a plurality of figures, obtaining radiosity values corresponding to coordinate information of said plurality of figures by referring to said radiosity maps, and supplying said radiosity values to a plurality of figure drawing sections; and a figure drawing step of drawing figures in parallel in said plurality of figure drawing sections by using said radiosity values of said plurality of figures supplied in said drawing control step.

11. The method according to claim 10, wherein said drawing control step includes:

a figure segmenting step of segmenting a figure corresponding to each of said plurality of surfaces to a plurality of figures to obtain coordinate information of said plurality of figures; and a radiosity-value computing step of obtaining radiosity values corresponding to coordinate information of said plurality of figures based on said radiosity maps.

12. The method according to claim 11, wherein said map processing step forms a plurality of radiosity maps including radiosity maps of front and back sides of each of said plurality of surfaces, and said drawing control step further includes a front and back determining step of determining whether a radiosity map in a given field of view is for a front side or back side of an associated surface from a front and back relationship of said radiosity map in said given field of view so as to skip a process for a radiosity map corresponding to figure drawing of said back side of said surface.

13. The method according to claim 11, wherein said radiosity-value computing step further includes an interpolation step of obtaining said radiosity values through interpolation in order to improve a precision of a correlation between said figures and said radiosity maps.

14. A drawing apparatus for obtaining a converged value of a radiosity indicative of an intensity of light energy on each surface of a plurality of surfaces of a three-dimensional graphical representation to be displayed, by repeating exchange of light energy among said plurality of surfaces for a predetermined number of times, and associating luminance to radiosity of said plurality of surfaces to form a radiosity image, said apparatus comprising:

positional-information setting means for segmenting each of said plurality of surfaces to a plurality of polygons and defining said each surface based on said segmented polygons, and setting information indicative of a position of one or more points on each of said polygons on a two-dimensional coordinate system in each surface as positional information of each polygon on said two-dimensional coordinate system;

map processing means for performing a process to form a plurality of radiosity maps indicative of a correlation between said positional information of each polygon and a pixel value equivalent to said radiosity at said position with respect to said plurality of surfaces;

a map storage memory storing said plurality of radiosity maps processed by said map processing means;

map referring/drawing means for referring to said plurality of radiosity maps and reading said pixel value corresponding to said positional information from said radiosity map corresponding to each surface; and an image buffer storing pixel values read by said map referring/drawing means to draw a radiosity image.

15. The apparatus according to claim 14, wherein said positional-information setting means sets, as said position information, map coordinate values in coordinates of one of said radiosity maps associated with each vertex of said each polygon on said two-dimensional coordinate system.

16. The apparatus according to claim 14, wherein said positional-information setting means includes identifier setting means for setting an identifier for each of said polygons of said each surface to identify said radiosity map to which said polygon is to refer; and said map referring/drawing means includes map selecting means for selecting said radiosity map associated with said identifier set by said identifier setting means.

17. The apparatus according to claim 16, wherein said identifier setting means sets a same identifier for a plurality of polygons indicating one or more surfaces among said plurality of surfaces.

18. The apparatus according to claim 17, wherein said identifier setting means groups a plurality of polygons constituting one or more surfaces among said plurality of surfaces based on information of at least one of a position of each of said plurality of surfaces and a direction of said each surface, and sets a same identifier for said grouped polygons.

19. The apparatus according to claim 14, wherein said positional-information setting means includes:

area computing means for computing an area of each of said polygons;

polygon sorting means for sorting said plurality of polygons in an order of area sizes using results of computation in said area computing means;

identifier setting means for extracting said plurality of polygons one by one in an sorting order in said polygon sorting means and grouping two or more polygons having similar surface directions and positions for a same identifier;

map-information computing means for computing a position, direction and size of said radiosity map based on information of a position and direction of a surface which refers to a same radiosity map and is grouped for said same identifier; and map-coordinate setting means for obtaining map coordinate values of vertices of each polygon based on said position, direction and size of said radiosity map computed in said map-information computing means.

20. The apparatus according to claim 15, wherein said map referring/drawing means includes:

coordinate transforming means for converting coordinate values of each vertex of said plurality of polygons of a first coordinate system to coordinate values of a second coordinate system based on given field-of-view data;

pixel developing means for developing said plurality of polygons to pixels to obtain pixel map coordinate values corresponding to individual pixels based on said coordinate values of individual vertices of said second coordinate system transformed in said coordinate transforming means; and pixel-value extracting means for extracting said pixel values corresponding to said pixel map coordinate values from said radiosity map for individual pixel map coordinate values obtained in said pixel developing means.

21. The apparatus according to claim 15, wherein said map referring/drawing means includes:

coordinate transforming means for converting coordinate values of each vertex of said plurality of polygons of a first coordinate system to coordinate values of a second coordinate system based on given field-of-view data;

polygon segmenting means for segmenting each of said plurality of polygons into a plurality of minute polygons based on said field-of-view data and vertex map coordinate values and vertex coordinate values corresponding to vertices of polygons, and obtaining vertex map coordinate values and vertex coordinate values of each of said segmented minute polygons;

pixel-value extracting means for reading said pixel values corresponding to said pixel map coordinate values from said radiosity map for individual vertex map coordinate values computed in said polygon segmenting means; and pixel developing means for developing said plurality of polygons to pixels based on said coordinate values of individual vertices of said second coordinate system transformed in said coordinate transforming means, and obtaining a luminance value corresponding to each developed pixel based on said pixel values read in said pixel-value extracting means.

22. The apparatus according to claim 16, wherein said map processing means includes:

map defining means for defining said plurality of radiosity maps as at least one shooting radiosity map and at least one gathering radiosity map;

an identifier buffer for storing map identifiers for individual pixels for identifying said gathering radiosity map for each pixel of a two-dimensional screen with said shooting radiosity map as a view point;

buffer-data producing means for producing identifier buffer data including map identifiers for said individual pixels to be stored in said identifier buffer, based on vertex coordinate values and vertex map coordinate values of each of said polygons and identifiers of said radiosity maps to which said polygons are to refer; and map updating means for updating data of each of said at least one gathering radiosity map according to radiosity information of said at least one shooting radiosity map based on said map identifier for each pixel stored in said identifier buffer.

23. The apparatus according to claim 22, wherein said buffer-data producing means includes:

shooting radiosity map selecting means for selecting one of said at least one shooting radiosity map;

transform-matrix computing means for setting a plurality of two-dimensional screens constituting a plurality of fields of view around a position of said one shooting radiosity map selected in said shooting radiosity map selecting means, and obtaining a plurality of transform matrices for conversion to said plurality of fields of view;

coordinate transforming means for performing coordinate transformation to convert coordinate values of each vertex of each polygon using said transform matrix obtained in said transform-matrix computing means; and pixel developing means for developing each polygon to pixels based on said map coordinate values of vertices of each polygon and said vertex coordinate values resulting from said coordinate transformation.

24. The apparatus according to claim 22, wherein said map updating means includes:

gathering map selecting means for reading each pixel identifier stored in said identifier buffer and selecting a gathering radiosity map corresponding to said pixel identifier;

form-factor computing means for obtaining a form factor representing a ratio of radiosity reaching a surface corresponding to said gathering radiosity map from a surface corresponding to said shooting radiosity map in accordance with a position corresponding to said pixel identifier; and radiosity-change computing means for multiplying said form factor, obtained in said form-factor computing means, by a pixel value stored in said shooting radiosity map to thereby obtain an amount of a change in radiosity in said gathering radiosity map corresponding to said pixel identifier.

25. The apparatus according to claim 24, wherein said map updating means further includes:

transform-matrix computing means for obtaining a transform matrix for converting a pixel position of said identifier buffer to pixel map coordinate values of said gathering radiosity map based on positional information of said shooting radiosity map and positional information of said gathering radiosity map; and pixel-map coordinate value computing means for converting said pixel position of said identifier buffer to said pixel map coordinate values of said gathering radiosity map using said transform matrix obtained in said transform-matrix computing means.

26. The apparatus according to claim 14, wherein said map processing means includes:

a plurality of parallel map updating means for updating said radiosity maps respectively; and map control means for allocating a plurality of radiosity maps to said plurality of map updating means selectively and in parallel and supplying said plurality of radiosity maps to said map updating means.

27. The apparatus according to claim 26, wherein each of said plurality of map updating means includes map holding means for holding a radiosity map for a updating process; and said map control means includes:

stay-resident allocation means for causing said radiosity maps, allocated in said plurality of map updating means, to stay resident in said map holding means; and writing-back means for writing updating results back to said map storage means at a time said map referring/drawing means refers to said radiosity maps.

28. The apparatus according to claim 27, wherein when there is no space in said map updating means, said map control means writes results of updating at least one radiosity map staying resident in said updated map updating means back to said map storage means and allocates a new radiosity map to said map updating means.

29. The apparatus according to claim 14, wherein said map referring/drawing means includes:

a plurality of parallel figure drawing means for drawing figures using radiosity values, respectively; and drawing control means for segmenting a figure corresponding to each of said plurality of surfaces to a plurality of figures, obtaining radiosity values corresponding to coordinate information of said plurality of figures by referring to said radiosity maps, and supplying said radiosity values in parallel to said plurality of figure drawing means.

30. The apparatus according to claim 29, wherein said drawing control means includes:

figure segmenting means for segmenting a figure corresponding to each of said plurality of surfaces to a plurality of figures to obtain coordinate information of said plurality of figures; and radiosity-value computing means for obtaining radiosity values corresponding to coordinate information of said plurality of figures based on said radiosity maps.

31. The apparatus according to claim 30, wherein said map processing section forms a plurality of radiosity maps including radiosity maps of front and back sides of each of said plurality of surfaces, and said drawing control section further includes a front and back determining section for determining whether a radiosity map in a given field of view is for a front side or back side of an associated surface from a front and back relationship of said radiosity map in said given field of view so as to skip a process for a radiosity map corresponding to figure drawing of said back side of said surface.

32. The apparatus according to claim 30, wherein said radiosity-value computing means further includes interpolation means for obtaining said radiosity values through interpolation in order to improve a precision of a correlation between said figures and said radiosity maps.

* * * * *